(12) United States Patent
Sabe et al.

(10) Patent No.: US 8,571,315 B2
(45) Date of Patent: Oct. 29, 2013

(54) INFORMATION PROCESSING APPARATUS, INFORMATION PROCESSING METHOD, AND PROGRAM

(75) Inventors: Kohtaro Sabe, Tokyo (JP); Kenichi Hidai, Tokyo (JP); Kiyoto Ichikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 13/288,231

(22) Filed: Nov. 3, 2011

(65) Prior Publication Data

US 2012/0134577 A1 May 31, 2012

(30) Foreign Application Priority Data

Nov. 26, 2010 (JP) ................................ 2010-263804

(51) Int. Cl.
G06K 9/00 (2006.01)
G06K 9/38 (2006.01)
G06K 9/62 (2006.01)
G06K 9/68 (2006.01)

(52) U.S. Cl.
USPC ........... 382/170; 382/103; 382/118; 382/159; 382/172; 382/181; 382/218; 382/224; 382/225; 382/169

(58) Field of Classification Search
None
See application file for complete search history.

(56) References Cited

U.S. PATENT DOCUMENTS

| 7,099,505 | B2 * | 8/2006 | Li et al. | 382/159 |
|---|---|---|---|---|
| 7,574,037 | B2 * | 8/2009 | Hidai et al. | 382/159 |
| 7,587,069 | B2 * | 9/2009 | Movellan et al. | 382/118 |
| 7,657,085 | B2 * | 2/2010 | Sabe et al. | 382/159 |
| 7,809,173 | B2 * | 10/2010 | Kitamura et al. | 382/118 |
| 7,853,086 | B2 * | 12/2010 | Kitamura | 382/224 |
| 7,869,629 | B2 * | 1/2011 | Kee et al. | 382/118 |
| 8,144,943 | B2 * | 3/2012 | Yashiro et al. | 382/118 |
| 8,155,396 | B2 * | 4/2012 | Ito | 382/118 |
| 8,155,399 | B2 * | 4/2012 | Liu et al. | 382/118 |
| 8,165,408 | B2 * | 4/2012 | Fukaya et al. | 382/224 |
| 8,233,720 | B2 * | 7/2012 | Waragai et al. | 382/205 |
| 8,447,139 | B2 * | 5/2013 | Guan et al. | 382/291 |
| 2008/0219565 | A1 * | 9/2008 | Hattori | 382/224 |
| 2009/0219405 | A1 * | 9/2009 | Kaneda et al. | 348/222.1 |

FOREIGN PATENT DOCUMENTS

JP 4517633 5/2010

OTHER PUBLICATIONS

Takeshi Mita, et al., "Joint Haar-like Features for Face Detection", Proceedings of the Tenth IEEE International Conference on Computer Vision (ICCV'05), 2005, 8 pages.

* cited by examiner

Primary Examiner — Matthew Bella
Assistant Examiner — Thomas Conway
(74) Attorney, Agent, or Firm — Oblon, Spivak, McClelland, Maier & Neustadt, L.L.P.

(57) ABSTRACT

An information processing apparatus includes: a distinguishing unit which, by using an ensemble classifier, which includes a plurality of weak classifiers outputting weak hypotheses which indicates whether a predetermined subject is shown in an image in response to inputs of a plurality of features extracted from the image, and a plurality of features extracted from an input image, sequentially integrates the weak hypotheses output by the weak classifiers in regard to the plurality of features and distinguishes whether the predetermined subject is shown in the input image based on the integrated value. The weak classifier classifies each of the plurality of features to one of three or more sub-divisions based on threshold values, calculates sum divisions of the sub-divisions of the plurality of features as whole divisions into which the plurality of features is classified, and outputs, as the weak hypothesis, a reliability degree of the whole divisions.

11 Claims, 22 Drawing Sheets

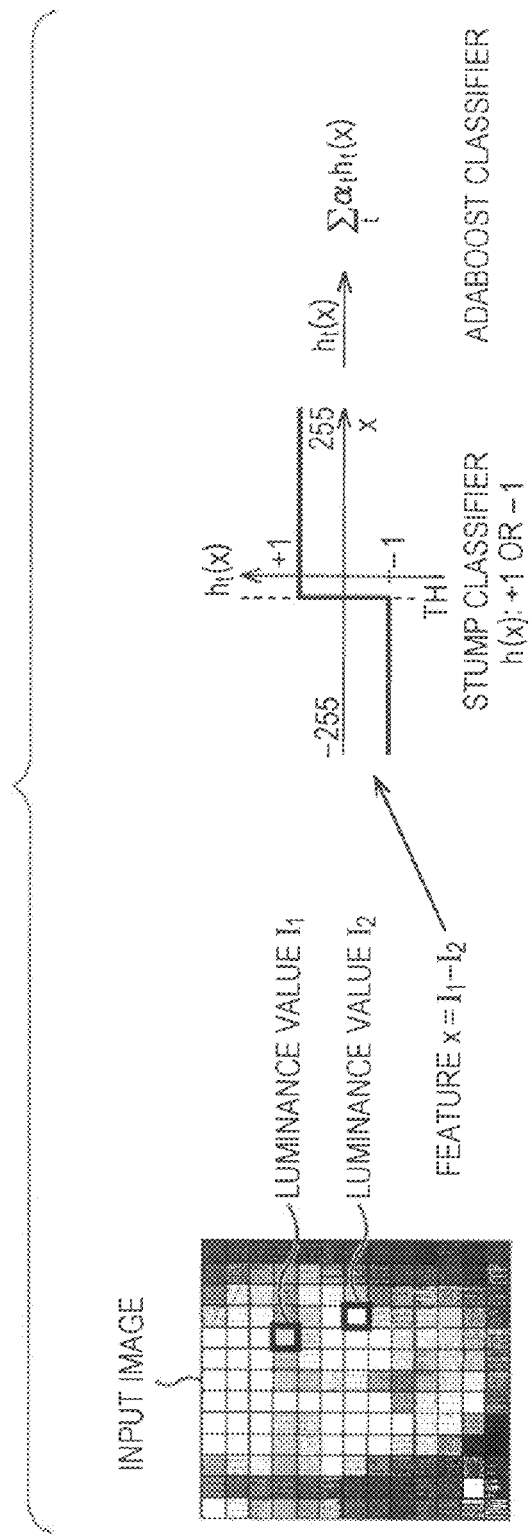

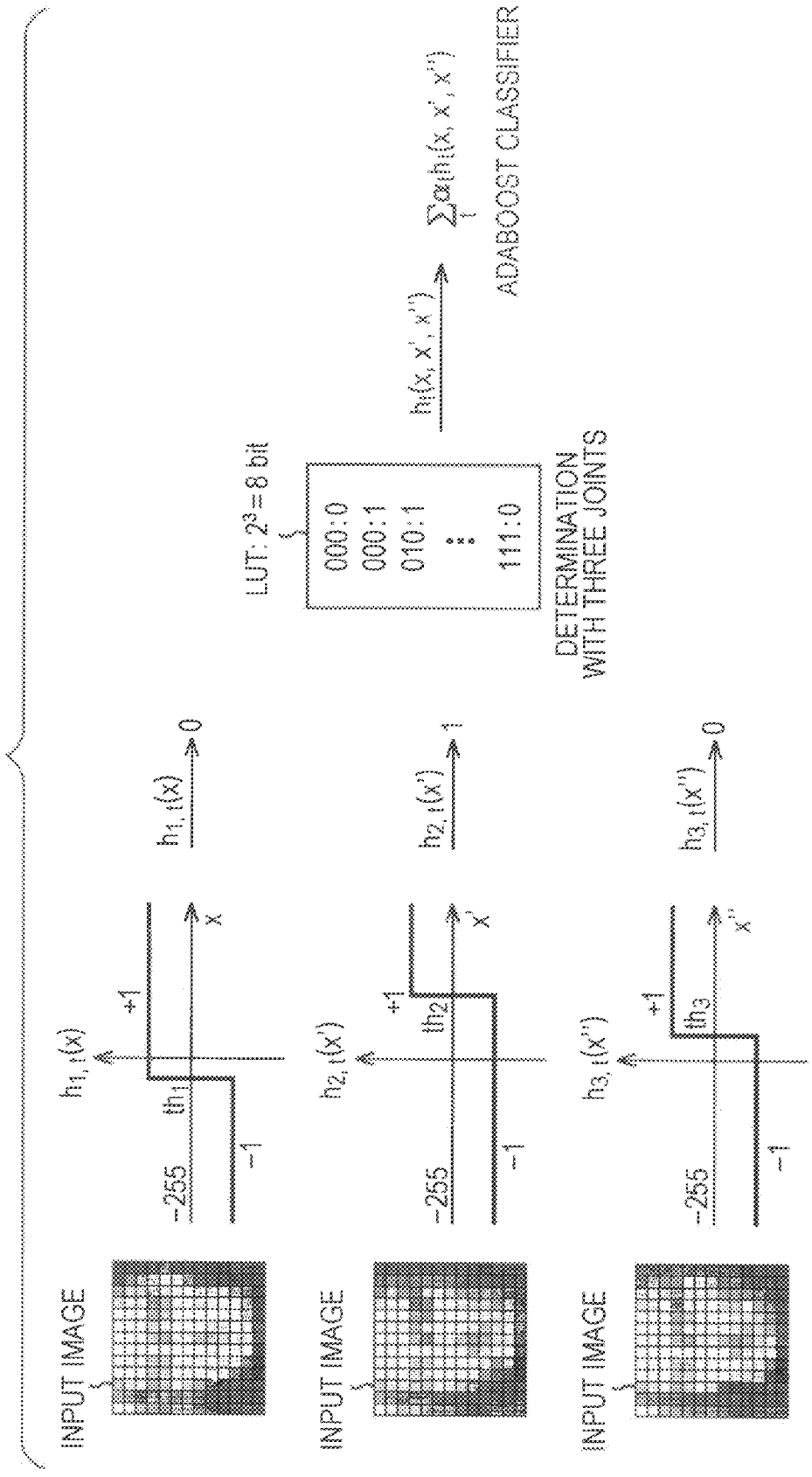

INFORMATION PROCESSING APPARATUS, INFORMATION PROCESSING METHOD, AND PROGRAM

BACKGROUND

The present disclosure relates to an information processing apparatus, an information processing method, and a program, and more particularly, to an information processing apparatus, an information processing method, and a program capable of distinguishing whether a predetermined subject is shown in an input image with high performance by the smaller number of features.

For example, there is boosting or bagging as an ensemble learning for learning a classifier which performs classification by majority decision on weak hypotheses which are outputs of a plurality of weak classifiers.

For example, U.S. Pat. No. 7,099,510, Japanese Patent No. 4517633, or "Joint Haar-like Features for Face Detection" by T. Mita, T. Kaneko, and O. Hori in the proceedings of IEEE International Conference on Computer Vision 2005 (ICCV 2005) discloses a method (subject distinguishing method) of recognizing an image pattern to distinguish whether a predetermined subject is shown in an image by the use of the classifier obtainable through the ensemble learning.

In U.S. Pat. No. 7,099,510, calculation of features and determination of a subject are performed at high speed by using a sum of the luminances of regions cut from an input image, called an integral image, input from the outside as the features of an image used for a subject distinguishing process of distinguishing whether a predetermined subject is shown in an image.

In Japanese Patent No. 4517633, a difference between the pixel values of two pixels in an input image calculated by just a very simple process called subtraction is used as a feature. Therefore, the performance of the subject distinguishing is sufficiently realized using the feature calculated only by the subtraction.

In Japanese Patent No. 4517633, since the positions of two pixels used for calculating the difference which is the feature are set for each of the weak classifiers of a classifier, it is necessary to calculate the feature of only the number of weak classifiers of the classifier.

However, the difference between the pixel values, which is the feature, can be calculated by only the very simple process called subtraction. Therefore, even when the difference between the pixel values is the feature of only of the number of weak classifiers of the classifier, the difference can be calculated at high speed. As a consequence, the subject distinguishing process can be performed at high speed.

In "Joint Haar-like Features for Face Detection" by T. Mita, T. Kaneko, and O. Hori in the proceedings of IEEE International Conference on Computer Vision 2005 (ICCV 2005), a plurality of Q features is each classified to one of two values and a class assignable to the combination of classification results of the two values of the respective Q features is output as one weak hypothesis (output of one weak classifier) in a table (so-called a Decision Table), in which one of two classes indicating whether a subject is shown in an input image in $2^Q$ combinations of the two values of the Q features.

In "Joint Haar-like Features for Face Detection" by T. Mita, T. Kaneko, and O. Hori in the proceedings of IEEE International Conference on Computer Vision 2005 (ICCV 2005), accordingly, one weak hypothesis is output in regard to the plurality of features in one weak classifier. Therefore, the features can be processed more efficiently compared to a case where one weak hypothesis is output in regard to one feature in one weak classifier.

SUMMARY

In "Joint Haar-like Features for Face Detection" by T. Mita, T. Kaneko, and O. Hori in the proceedings of IEEE International Conference on Computer Vision 2005 (ICCV 2005), a weak hypothesis unit classifies each of the Q features to one of the two values and outputs, as a weak hypothesis, the class assignable to the combination of the classification results of the two values of the respective Q features.

Since the class indicates whether the subject is shown in the input image, the class has two values. Accordingly, in "Joint Haar-like Features for Face Detection" by T. Mita, T. Kaneko, and O. Hori in the proceedings of IEEE International Conference on Computer Vision 2005 (ICCV 2005), the combination of the classification results of the two values of the respective Q features is digitalized and output as the weak hypothesis. Therefore, since a lot of information included in the feature is lost in the digitalized weak hypothesis, a lot of the loss of information may have a bad influence on the performance of the subject distinguishing process.

In order to prevent the loss of the information and perform the subject distinguishing process with high performance, multiple features can be used as a plurality of features given to the weak hypothesis unit. However, when the multiple features are used, it takes some time to calculate the multiple features. As a consequence, the subject distinguishing process may not be performed at high speed.

It is desirable to provide an information processing apparatus, an information processing method, and a program capable of performing a subject distinguishing process with a smaller number of features and with high performance.

According to an embodiment of the disclosure, there is provided an information process apparatus or a program causing a computer to function as the information processing apparatus including a distinguishing unit which, by using an ensemble classifier, which includes a plurality of weak classifiers outputting weak hypotheses which indicates whether a predetermined subject is shown in an image, in response to inputs of a plurality of features extracted from the image, and a plurality of features extracted from an input image, sequentially integrates the weak hypotheses output by the weak classifiers in regard to the plurality of features and distinguishes whether the predetermined subject is shown in the input image based on the integrated value of the weak hypotheses. The weak classifier classifies each of the plurality of features to one of three or more sub-divisions based on threshold values, calculates sum divisions of the sub-divisions of the plurality of features as whole divisions into which the plurality of features is classified, and outputs, as the weak hypothesis, a reliability degree of the whole divisions assignable to the whole divisions of the plurality of features. The ensemble classifier is calculated by ensemble learning. In the ensemble learning, the reliability degree of the whole divisions is assignable to the respective whole divisions of the weak classifier.

According to another embodiment of the disclosure, there is provided an information processing method including by using an ensemble classifier, which includes a plurality of weak classifiers outputting weak hypotheses which indicates whether a predetermined subject is shown in an image, in response to inputs of a plurality of features extracted from the image, and a plurality of features extracted from an input image, sequentially integrating the weak hypotheses output by the weak classifiers in regard to the plurality of features and distinguishing whether the predetermined subject is shown in the input image based on the integrated value of the weak hypotheses by an information processing apparatus. The weak classifier classifies each of the plurality of features to one of three or more sub-divisions based on threshold values, calculates sum divisions of the sub-divisions of the plurality of features as whole divisions into which the plurality of features is classified, and outputs, as the weak hypothesis, a reliability degree of the whole divisions assignable to the whole divisions of the plurality of features. The ensemble classifier is calculated by ensemble learning. In the ensemble learning, the reliability degree of the whole divisions is assignable to the respective whole divisions of the weak classifier.

According to the embodiments of the disclosure, by using an ensemble classifier, which includes a plurality of weak classifiers outputting weak hypotheses which indicates whether a predetermined subject is shown in an image, in response to inputs of a plurality of features extracted from the image, and a plurality of features extracted from an input image, the weak hypotheses output by the weak classifiers are sequentially integrated in regard to the plurality of features and it is distinguished whether the predetermined subject is shown in the input image based on the integrated value of the weak hypotheses. The weak classifier classifies each of the plurality of features to one of three or more sub-divisions based on threshold values, calculates sum divisions of the sub-divisions of the plurality of features as whole divisions into which the plurality of features is classified, and outputs, as the weak hypothesis, a reliability degree of the whole divisions assignable to the whole divisions of the plurality of features. The ensemble classifier is calculated by ensemble learning. In the ensemble learning, the reliability degree of the whole divisions is assignable to the respective whole divisions of the weak classifier.

The information processing apparatus may be an independent apparatus or may be an internal block of one apparatus.

The program can be transmitted via a transmission medium or can be recorded to be provided in a recording medium.

According to the embodiments of the disclosure, the subject distinguishing process of distinguishing the predetermined subject is shown in the input image can be performed with a smaller number of features and with high performance.

BRIEF DESCRIPTION OF THE DRAWINGS

FIG. 7 is a diagram of a classifier having the stump classifier;

FIG. 8 is a diagram of a classifier having a joint classifier;

DETAILED DESCRIPTION OF EMBODIMENTS

Determination Apparatus According to Embodiment of the Disclosure

Figure 1:
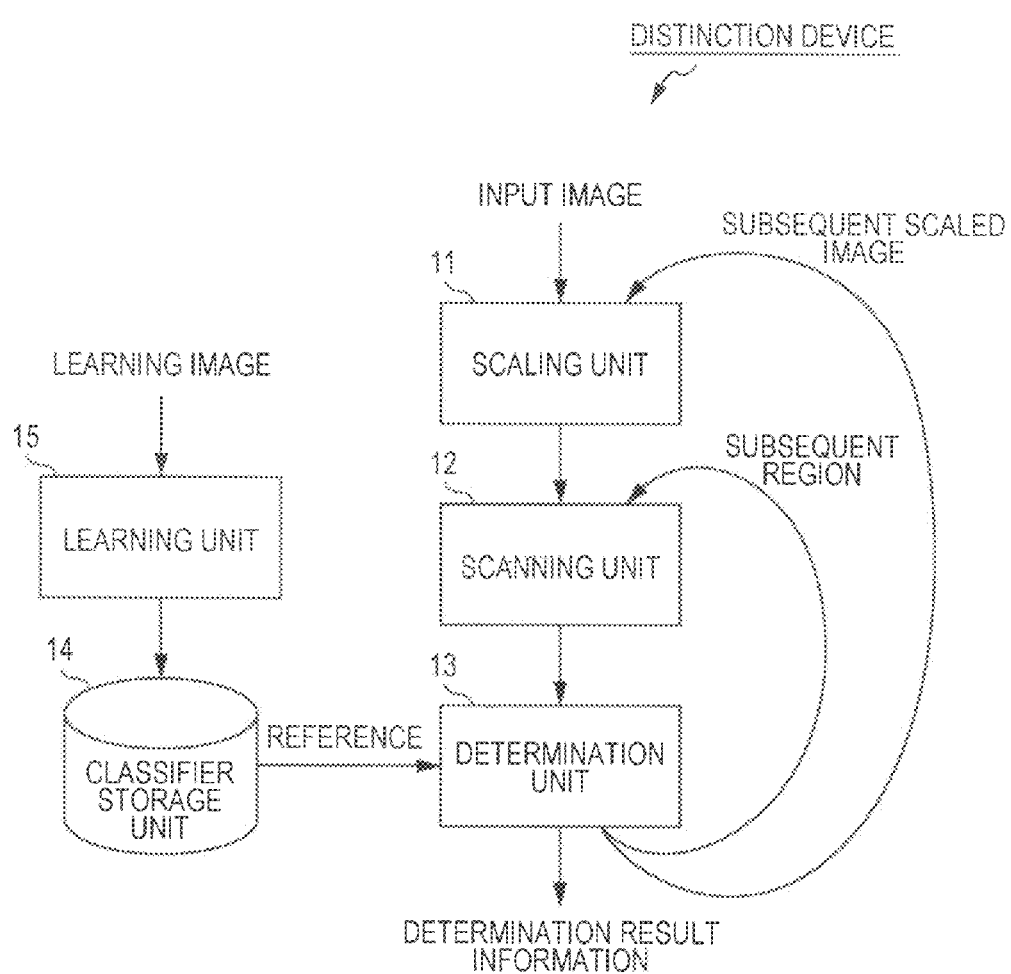
FIG. 1 is a block diagram of an example of the configuration of a distinguishing apparatus to which an information processing apparatus is applied according to an embodiment of the disclosure.

FIG. 1 is a block diagram of an example of the configuration of a distinguishing apparatus to which an information processing apparatus is applied according to an embodiment of the disclosure.

In FIG. 1, a distinguishing apparatus includes a scaling unit 11, a scanning unit 12, a distinguishing unit 13, a classifier storage unit 14, and a learning unit 15. The distinguishing apparatus performs a subject distinguishing process of distinguishing whether a predetermined subject such as a human face is shown in an input image input from the outside, and then output the distinguishing result.

The scaling unit 11 is supplied with an input image of a subject to be subjected to the subject distinguishing process.

The scaling unit 11 reduces the input image at a reduction ratio through, for example, bilinear interpolation under to the control of the distinguishing unit 13 and supplies the reduced image obtained through the reduction as a scaled image scaled from the input image to the scanning unit 12.

The scanning unit 12 scans the position of a window with a predetermined size of, for example, 20×20 pixels or the like in horizontal and vertical directions on the scaled image from the scaling unit 11 through scanning such as so-called raster scanning under the control of the distinguishing unit 13 and moves the position of the window on the scaled image.

The scanning unit 12 cuts out an image (hereinafter, also referred to as a window image) within the window in the scaled image and supplies the window image to the distinguishing unit 13.

The distinguishing unit 13 distinguishes whether a predetermined subject such as a human face is shown in the input image by the use of a classifier stored in the classifier storage unit 14 and the window image supplied from the scanning unit 12, while controlling the scanning unit 11 and the scanning unit 12. Then, the distinguishing unit 13 outputs distinguishing result information which indicates the distinguishing result.

That is, the distinguishing unit 13 controls the scaling unit 11 in order to reduce the input image at a predetermined reduction ratio.

The scaling unit 11 supplies the scanning unit 12 with a reduced image obtained by reducing the input image at the predetermined reduction ratio under the control of the distinguishing unit 13 as a scaled image.

The distinguishing unit 13 controls the scanning unit 12 in order to move the window in a raster scan order on the scaled image obtained from the scaling unit 11.

Under the control of the distinguishing unit 13, the scanning unit 12 reiterates a process of moving the window rightward in a predetermined pixel number unit such as one pixel from the left upper portion of the scaled image, moving down the window in a predetermined pixel number unit such as one pixel when the window reaches the right end of the scaled image, and then again moving the window rightward until the window reaches the lower right portion of the scaled image.

Then, the scanning unit 12 cuts out the window image which is an image within the window at the moved position from the scaled image whenever the window moves, and then supplies the window image to the distinguishing unit 13.

In this way, the distinguishing unit 13 performs a window image distinguishing process of distinguishing whether the subject is shown in the window image supplied from the scanning unit 12.

The distinguishing unit 13 controls the scanning unit 11 such that the input image is reduced at a reduction ratio less than the previous reduction ratio when the window reaches the right lower portion of the scaled image. Then, the distinguishing unit 13 reiterates the same process until the scaled image has a size smaller than the window size.

Thus, the distinguishing unit 13 can detect subjects with various sizes present in the input image by performing the window image distinguishing process of distinguishing whether the subject is shown in the window image cut out from the scaled image obtained by reducing the input image at various reduction ratios.

The classifier storage unit 14 stores an ensemble classifier which is a classifier necessary when a learning unit 15 performs ensemble learning.

The ensemble classifier stored in the classifier storage unit 14 has a plurality of weak classifiers outputting a weak hypothesis, which indicates whether a subject is shown in the input image in response to inputs of a plurality of features extracted from the input image.

The distinguishing unit 13 obtains weak hypotheses, which are outputted from the weak classifier in regard to the plurality of features, by extracting (calculating) the plurality of features from the window image from the scanning unit 12 in the window image distinguishing process and inputting the plurality of features into the weak classifiers forming the ensemble classifier.

The distinguishing unit 13 sequentially integrates the weak hypotheses output by the respective weak classifiers forming the ensemble classifier and distinguishes whether the subject is shown in the window image based in the integration value.

The learning unit 15 calculates the ensemble classifier for identifying whether the subject is present in an image (the subject is shown in the image) by performing ensemble learning, and then supplies and stores the ensemble classifier in the classifier storage unit 14.

That is, the learning unit 15 is supplied with the plurality of learning images used for the ensemble learning.

The size of the learning image is the same as that of the window image. The plurality of learning images includes a positive image, in which the subject is shown, and a negative image, in which the subject is not shown.

A label (accuracy label) indicating that the learning image is one of the positive image and the negative image is annexed to each learning image.

The learning unit 15 calculates the ensemble classifier for identifying whether the subject is present in an image by performing the ensemble learning by the use of the plurality of learning images.

In FIG. 1, the distinguishing apparatus includes the learning unit 15 performing the ensemble learning for calculating the ensemble classifier. However, the distinguishing apparatus may not include the learning unit 15 and the learning unit 15 may be configured as an apparatus separated from the distinguishing apparatus.

Process of Scaling Unit 11

Figure 2:
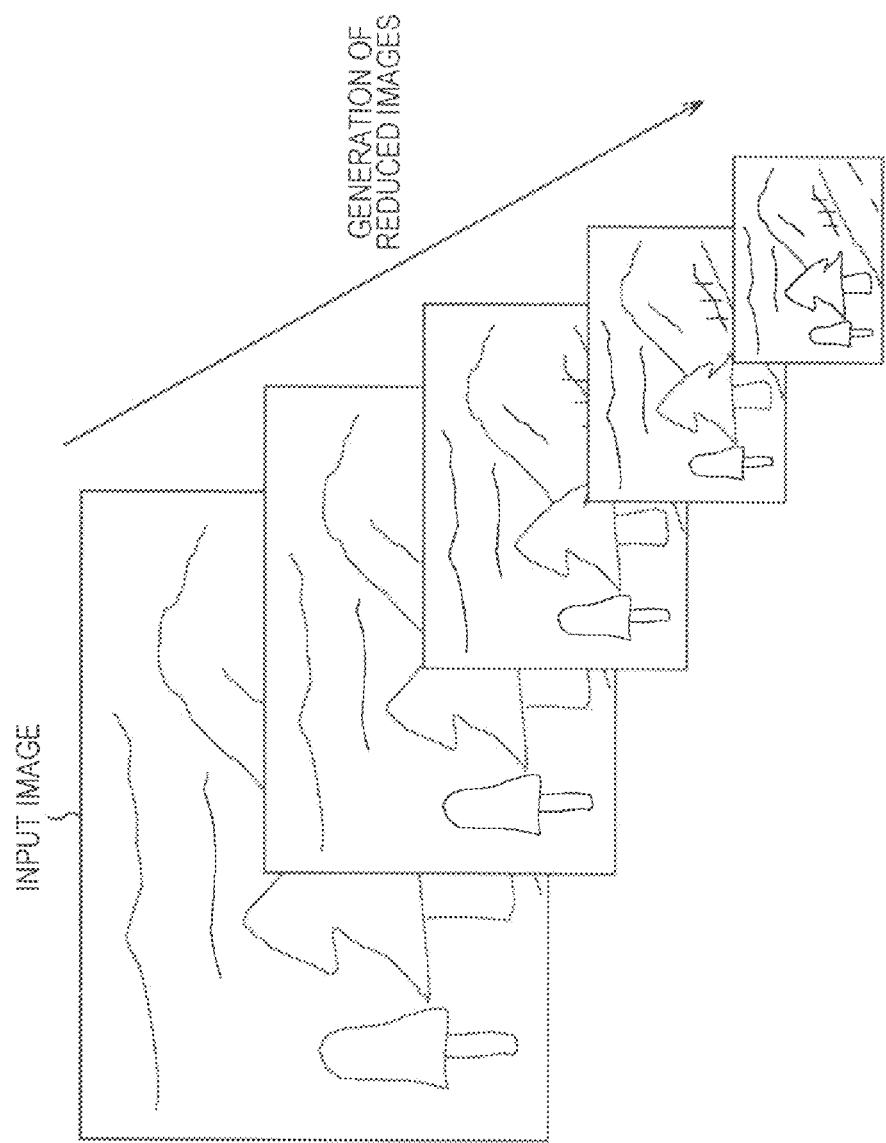
FIG. 2 is a diagram for a process of a scaling unit.

FIG. 2 is a diagram for describing a process of the scaling unit 11 in FIG. 1.

As shown in FIG. 1, the scaling unit 11 reduces the input image at gradually smaller reduction ratios and generates the scaled images which are reduced images corresponding to the respective reduction ratios under the control of the distinguishing unit 13.

Process of Scanning Unit 12

Figure 3:
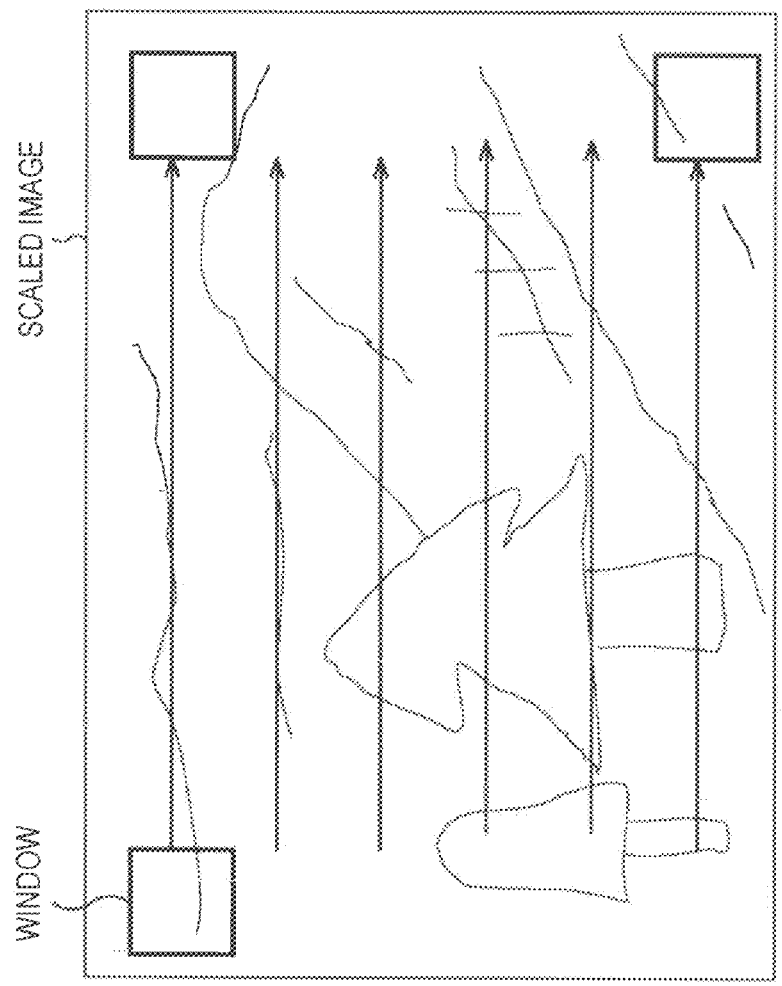
FIG. 3 is a diagram for a process of a scanning unit.

FIG. 3 is a diagram for describing a process of the scanning unit 12 in FIG. 1.

As described above with reference to FIG. 1, under the control of the distinguishing unit 13, the scanning unit 12 reiterates the process of moving the window rightward to a predetermined pixel number unit such as one pixel from the left upper portion of the scaled image from the scaling unit 11, moving down the window in a predetermined pixel number unit such as one pixel when the window reaches the right end of the scaled image, and then again moving the window rightward until the window reaches the lower right portion of the scaled image.

Then, the scanning unit 12 cuts out the window image which is an image within the window at the moved position from the scaled image whenever the window moves, and then supplies the window image to the distinguishing unit 13.

Overview of Ensemble Classifier

Figure 4:
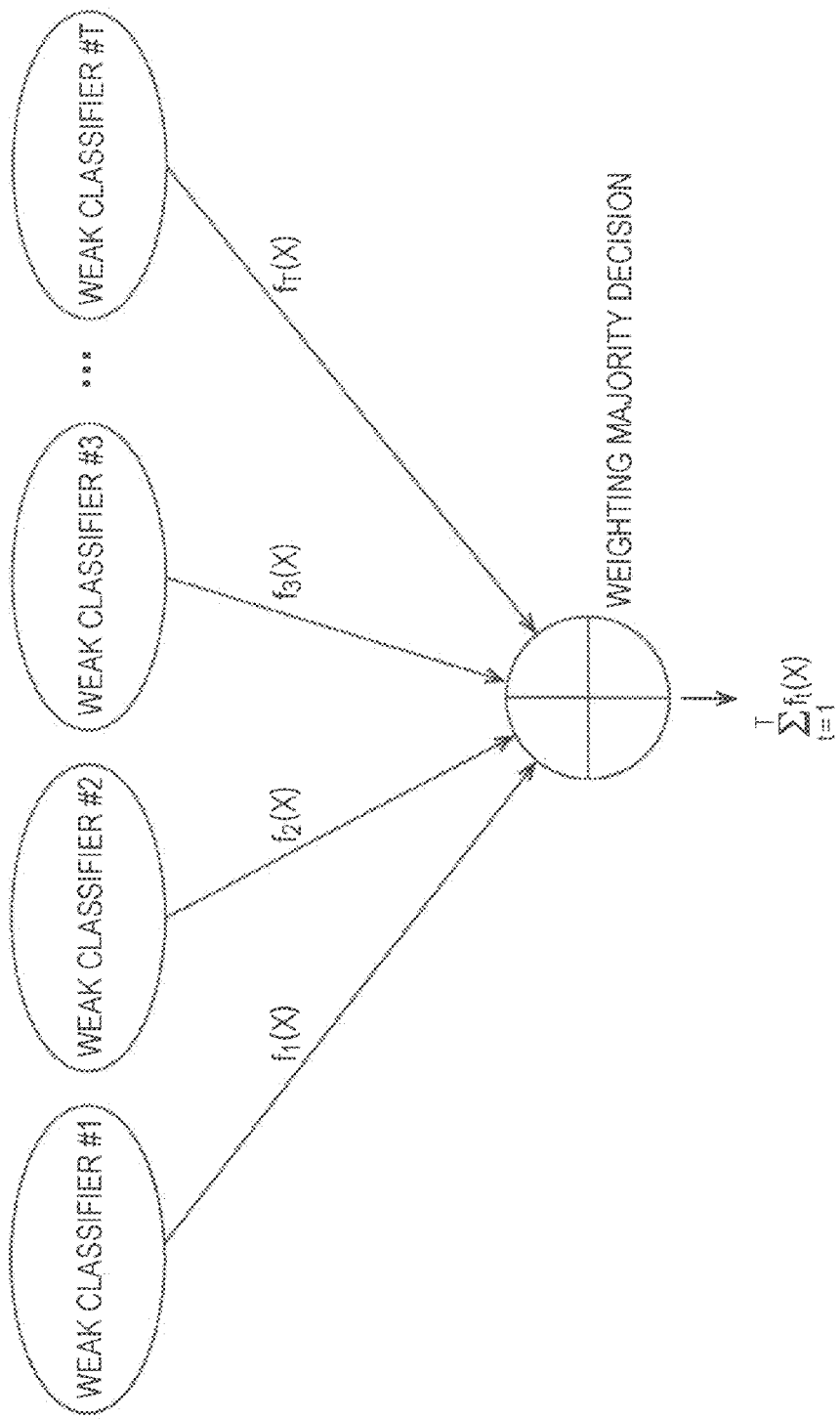
FIG. 4 is a diagram of the overview of an ensemble classifier stored in a classifier storage unit.

FIG. 4 is a diagram of the overview of an ensemble classifier stored in a classifier storage unit 14 in FIG. 1.

The ensemble classifier include T weak classifiers #1, #2, . . . , and #T outputting the weak hypothesis, which indicates whether a subject is shown in the window image, in response to inputs of the plurality of features extracted from the window image (window image cut out from the input image).

The distinguishing unit 13 (see FIG. 1) obtains weak hypotheses $f_1(X), f_2(X), \ldots,$ and $f_T(X)$, which are output from the weak classifiers #1 to #T, in regard to the plurality of features X by extracting (calculating) the plurality of features X from the window image and inputting the plurality of features X to the weak classifiers #1 to #T of the ensemble classifier.

The distinguishing unit 13 performs weighting majority decision of the weak hypotheses $f_t(X)$ output by the respective weak classifiers #t of the ensemble classifier and performs the window image distinguishing process of distinguishing whether the subject is shown in the window image based on the result of the weighting majority decision.

That is, the distinguishing unit 13 sequentially integrates the weak hypotheses $f_t(X)$ (which are weighted, if necessary) output by the respective weak classifiers #t of the ensemble classifier and performs the window image distinguishing process of distinguishing whether the subject is shown in the window image based on an integrated value $\Sigma f_t(X)$ $(=f_1(X)+f_2(X)+ \ldots +f_T(X))$ obtained as the calculation result.

Features

Figure 5:
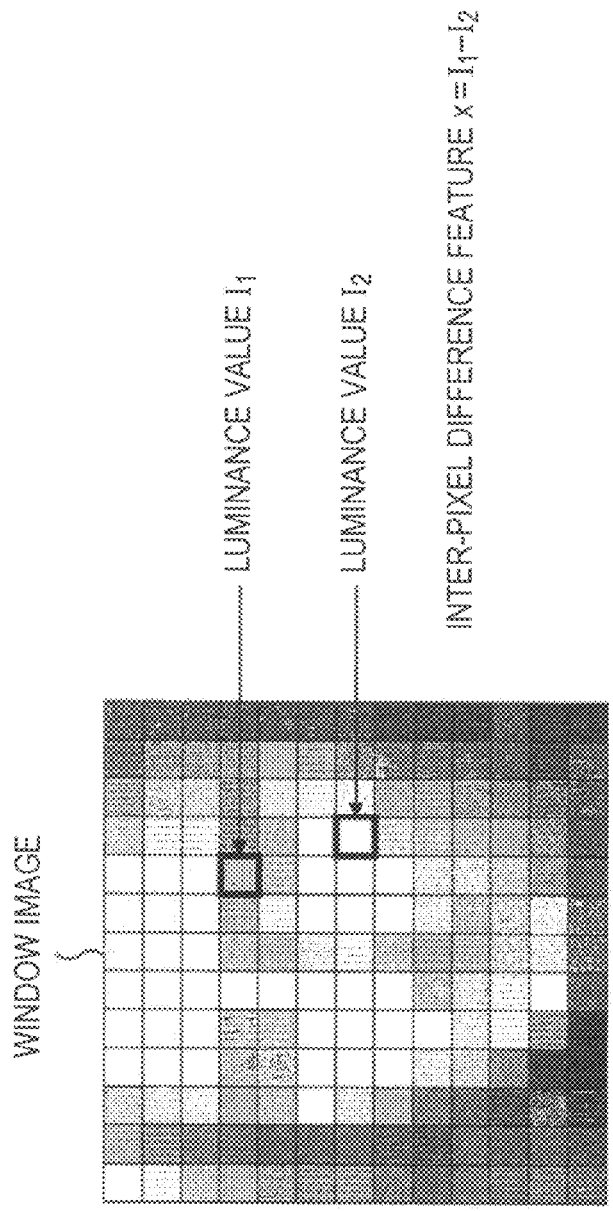
FIG. 5 is a diagram of a feature extracted from a window image by a distinguishing unit.

FIG. 5 is a diagram of the features extracted from the window image by the distinguishing unit 13 in FIG. 1.

The distinguishing unit 13 can adopt any feature as the feature extracted from the window image.

That is, the distinguishing unit 13 can adopt, for example, the Haar-like feature or the like described in U.S. Pat. No. 7,099,510 as the feature extracted from the window image.

In this way, the distinguishing unit 13 can adopt any feature as the feature extracted from the window image. However, when it takes some time to calculate (extract) the feature, a subject distinguishing process performed by the distinguishing apparatus in FIG. 1 may be inhibited from being performed at high speed.

Accordingly, in the embodiment of the disclosure, the features which can be calculated by a simple process are adopted in order to perform the subject distinguishing process at high speed.

For example, a difference (hereinafter, also referred to as an inter-pixel difference feature) between the pixel values of pixels located at two positions in the window image can be used as the feature which can be calculated by the simple process.

The inter-pixel difference feature is a difference between the pixel values such as a difference between the luminances of the pixels located at two positions in the window image. The inter-pixel difference feature can be calculated at high speed since the inter-pixel difference feature can be calculated by a very simple process called subtraction.

When the size of the window image is, for example, 20×20 pixels in the horizontal and vertical directions, the size of the window image is 20×20 pixels. Further, there are only 79,800=400×399/2 combinations as combinations of the positions of two pixels used to extract the inter-pixel difference feature from the window image with 20×20 pixels.

Accordingly, when the size of the window image is 20×20 pixels and the inter-pixel difference feature is used as the feature extracted from the window image, the features of the 79,800 combinations, which are a total number of combinations of the positions of two pixels used to extract the inter-pixel difference feature, can be defined.

As shown in FIG. 5, for example, when a luminance value $I_1$ and a luminance value $I_2$ are shown as the pixel values of the pixels at the positions (pixel positions) of two pixels in the window image, an inter-pixel difference feature x can be calculated by Expression (1).

$$X = I_1 - I_2 \quad (1)$$

When the inter-pixel difference feature is calculated, two pixel positions are necessary. As a method of expressing the pixel positions, for example, xy coordinates of an xy coordination system using the left upper point of the window image as the origin may be used. Alternatively, there may be adopted a method (hereinafter, also referred to as a sequence of the raster scan order) of making the pixels of the window image to correspond to which number pixels of the window image when the pixels of the window image are scanned in a raster scan order.

Since the xy coordinates are two-dimensional and the sequence of the raster scan order is one-dimensional, the capacity of a memory storing the pixel positions may be less used in the sequence of the raster scan order than in the xy coordinates as the method of expressing the pixel positions.

A method of calculating two pixel positions in the calculation of the inter-pixel difference feature will be described below.

Weak Classifier Including Classifiers Calculated by Ensemble Learning

Next, the weak classifiers of the classifier calculated by the ensemble learning according to the related art will be described as preparation of the previous stage, before the ensemble learning performed by the learning unit 15 in FIG. 1 is described.

Figure 6A:
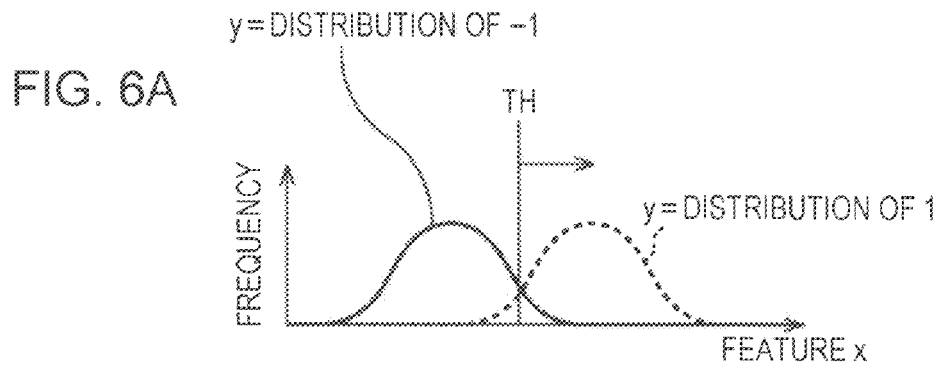
FIGS. 6A to 6C are diagrams of a stump classifier.
Figure 6B:
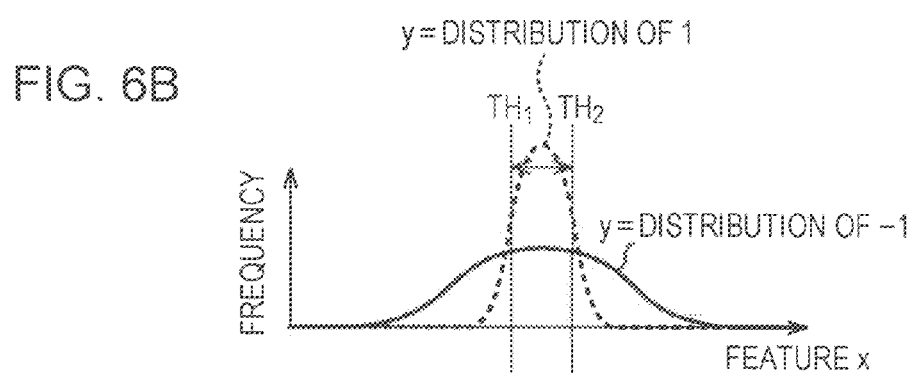
Figure 6C:
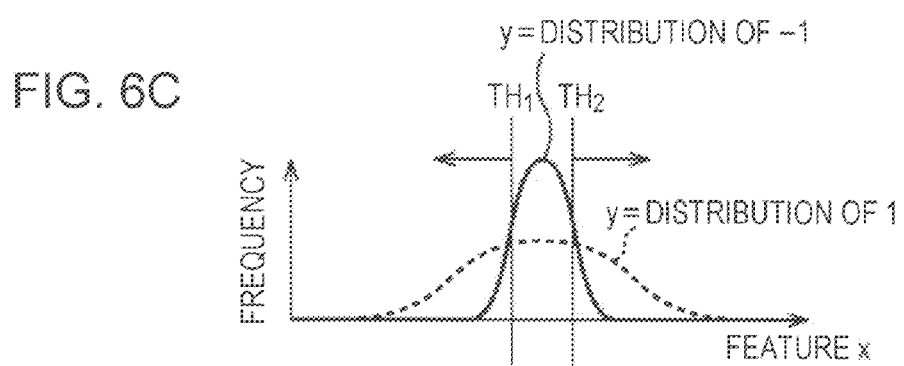

FIGS. 6A and 6C are diagrams of the weak classifier called a stump classifier.

As the stump classifier, an image is classified into two classes indicating whether a subject such as a human face is shown by the use of the feature of the image. The stump classifier is classified in accordance with a magnitude relation between a feature and a threshold value TH.

That is, as for the stump classifier, an image is classified (divided) into a class in which the subject is shown and a class in which no subject is shown depending on whether the feature x satisfies an expression "x>TH".

FIGS. 6A, 6B, and 6C show examples of a frequency distribution of the feature x of a plurality of images including an image (positive image) in which the subject is shown and an image (negative image) in which no subject is shown.

Here, when an image is the positive image, a accuracy label y is set to +1. When an image is the negative image, the accuracy label y is set to −1.

In FIG. 6A, the feature x of an image of the accuracy label y of +1, that is, a positive image is distributed relatively right, whereas the feature x of an image of the accuracy label y of −1, that is, a negative image is distributed relatively left.

In this case, for example, as for the stump classifier, it is possible to relatively accurately classify the image into the class for which the subject is shown and the class for which no subject is shown by setting a median point between the frequency distribution of the feature x of the positive image (y=+1) and the frequency distribution of the feature x of the negative image (y=−1) to the threshold value TH.

When the class for which the subject is shown is indicated with +1 and the class for which no subject is shown indicated with −1, a weak classifier h(x) which is the stump classifier outputs +1 as a weak hypothesis h(x) when the feature x satisfies the expression "x>TH", whereas outputting −1 as a weak hypothesis h(x) when the feature x does not satisfy the expression "x>TH."

As shown in FIG. 6A, when the frequency distribution of the feature x of the positive image (y=+1) and the frequency distribution of the feature x of the negative image (y=−1) are relatively separately distributed, the image can be classified relatively accurately.

However, in some cases, the feature of the negative image in which no subject is shown, that is, the negative image in which a portion other than the subject is shown is distributed relatively evenly in a space (feature space) of the feature.

When the inter-pixel difference feature is adopted as the feature, there is no so large difference in the luminance of the respective pixels of the negative image and the inter-pixel difference feature of the negative image is distributed near 0 relatively concentratedly.

In this case, the frequency distributions of the features are shown in FIGS. 6B and 6C.

In FIG. 6B, the feature x of the positive image (y=+1) is distributed at the center relatively concentratedly and the feature x of the negative image (y=−1) is distributed relatively extensively from the center.

In FIG. 6C, the feature x of the positive image (y=+1) is distributed relatively extensively from the center and the feature x of the negative image (y=−1) is distributed at the center relatively concentratedly.

For the distributions shown in FIGS. 6B and 6C, the image can be classified relatively accurately by using two threshold values $TH_1$ and $TH_2$ ($>TH_1$) interleaved in the distribution concentrated at the center.

That is, when the feature x satisfies an expression "$TH_1 \leq x \leq TH_2$", +1 is output as a weak hypothesis h(x). When the feature x does not satisfy the expression "$TH_1 \leq x \leq TH_2$", −1 is output as a weak hypothesis h(x). In this way, the image can be classified relatively accurately in the distribution shown in FIG. 6B.

Further, when the feature x satisfies an expression "$x < TH_1$" or an expression "$TH_2 < x$", +1 is output as a weak hypothesis H(x). When the feature x does not satisfy the expression "$x < TH_1$" or the expression "$TH_2 < x$", −1 is output as the weak hypothesis H(x). In this way, the image can be classified relatively accurately in the distribution shown in FIG. 6C.

When the two threshold values $TH_1$ and $TH_2$ are used, the feature can be divided into three divisions: a division (range) satisfying an expression $x \leq TH_1$, a division satisfying an expression $TH_1 < x \leq TH_2$, and a division satisfying an expression $TH_2 < x$.

Accordingly, when the two threshold values $TH_1$ and $TH_2$ are used, the feature x can be classified to one of the section satisfying the expression $x \leq TH_1$, the section satisfying the expression $TH_1 < x \leq TH_2$, and the section satisfying the expression $TH_2 < x$. Therefore, the weak classifier h(x) which is the stump classifier can output one of three values corresponding to the three sections as the weak hypothesis.

That is, when the two threshold values $TH_1$ and $TH_2$ are used, the weak classifier which is the stump classifier can classify the image into three classes using the feature x of the image.

In this case, the weak hypothesis h(x) which is an output of the weak classifier is expressed as Expression (2).

$$h(x) = [x > TH_2] + [x > TH_1] \quad (2)$$

In Expression (2), $[x > TH_2]$ becomes 1 when x satisfies the expression $x > TH$ in the square brackets, whereas $[x > TH_2]$ becomes 0 when x does not satisfy the expression $x > TH$ in the square brackets.

According to Expression (2), the weak hypothesis h(x) becomes 0 when the feature x is equal to or less than threshold value $TH_1$. The weak hypothesis h(x) becomes 1 when the feature x is greater than the threshold value $TH_1$ and is equal to or less than the threshold value $TH_2$. The weak hypothesis h(x) becomes 2 when the feature x is equal to or greater than the threshold value $TH_2$.

Classifier Having Stump Classifier as Weak Classifier

FIG. 7 is a diagram of a classifier (classifier calculated by the ensemble learning) having the stump classifier as the weak classifier.

Here, since the weak classifier of the classifier outputs the weak hypothesis in response to an input of the feature x, the weak classifier can be regarded as a function of using the feature x as a parameter.

Accordingly, a t-th weak classifier of the classifier and the weak hypothesis which is an output of the weak classifier are expressed appropriately below as a function (value) $h_t(x)$ or $f_t(x)$ of using the feature x as a parameter.

Further, $h_t(x)$ represents a function which outputs an integer as a discrete value and $f_t(x)$ represents a function which outputs a real number as a function value.

In the classifier having the stump classifier as the weak classifier, for example, the t-th weak classifier $h_t(x)$ outputs one of two values +1 and −1 in accordance with the magnitude relation between the feature x and the threshold value TH.

That is, the t-th weak classifier $h_t(x)$ outputs −1 when the feature x is equal to or less than the threshold value TH, whereas outputting +1 when the feature x is greater than the threshold value TH.

The classifier having the stump classifier as the weak classifier outputs the sign of a weighted sum value $\Sigma \alpha_t h_t(x)$ ($= \alpha_1 h_1(x) + \alpha_2 h_2(x) + \ldots + \alpha_T h_T(x)$), which is obtained through weighting (weighting majority decision) of the t-th weak classifier $h_t(x)$ by using as a reliability degree $\alpha_t$ of the t-th weak classifier as a weight, as the classification result (final hypothesis) that the image is the positive image or the negative image.

When the final hypothesis is positive (+), that is, the weighted sum value $\Sigma \alpha_t h_t(x)$ is greater than 0, it is meant that the image is the positive image. When the final hypothesis is not positive, it is meant that the image is the negative image.

In this way, the ensemble learning of the classifier having the stump classifier as the weak classifier can be performed by, for example, AdaBoost which is a kind of boosting. Therefore, the threshold value TH and the reliability degree $\alpha_t$ are calculated as the parameter (at least one parameter) of the weak classifier $h_t(x)$.

Classifier Having Joint Classifier as Weak Classifier

FIG. 8 is a diagram of a classifier having a joint classifier as the weak classifier.

The joint classifier is a weak classifier described in "Joint Haar-like Features for Face Detection" by T. Mita, T. Kaneko, and O. Hori in the proceedings of IEEE International Conference on Computer Vision 2005 (ICCV 2005). The joint classifier has a plurality of functions therein, like the stump classifier.

The functions that the joint classifier has therein are constituent elements of the joint classifier and are also referred to as element functions below.

The joint classifier outputs one weak hypothesis in response to an input of the plurality of features.

Further, the joint classifier has the same number of element functions as the number of Q features input thereto. The plurality of features can be given to the corresponding element functions, respectively.

In the t-th joint classifier included in the classifier, the element function provided with the q-th feature x among the plurality of features is indicated by $h_{q,t}(x)$.

FIG. 8 shows an example of a joint classifier $h_t(x, x', x'')$ provided with three features x, x', and x''. Accordingly, the joint classifier $h_t(x, x', x'')$ has three element functions $h_{1,t}(x)$, $h_{2,t}(x')$, and $h_{3,t}(x'')$.

The element function $h_{q,t}(x)$ outputs one of the two values of +1 and −1 in accordance with a magnitude relation between the feature x and a threshold value $th_q$, like the stump classifier described with reference to FIG. 7.

According to the joint classifier $h_t(X=(x, x', x'))$, the three features $X=(x, x', x'')$ can be classified into divisions of $8 = 2^3$ combinations by jointing the outputs of the two values of the three element functions $h_{1,t}(x)$, $h_{2,t}(x')$, and $h_{3,t}(x'')$.

The joint classifier $h_t(X)$ has an LUT (Look Up Table) to which one of two classes, which are a class indicating the positive image and a class indicating the negative image, is assigned for each of the above-described eight combinations as well as the element function $h_{q,t}(x)$.

In this case, since there are two classes, the classes can be expressed by one bit. Accordingly, the LUT of the joint classifier $h_t(X)$ is a table to which the class expressed by one bit can be assigned in the divisions of the eight combinations and has a capacity of 8 bits.

That is, in the LUT of the joint classifier $h_t(X)$, the 1-bit class assignable to the division is registered in an address corresponding to each of the divisions of the eight combinations.

The joint classifier $h_t(X)$ outputs, as the weak hypothesis, the 1-bit class assignable to the divisions into which the three features X=(x, x', x") are classified in the 8-bit LUT.

For example, when the class of the positive image is indicated by +1 and the class of the negative image is indicated by −1, the t-th joint classifier $h_t(X)$ outputs, as the weak hypothesis, one of the two values of +1 and −1, like the stump classifier described with reference to FIG. 7.

The classifier having the stump classifier as the weak classifier outputs the sign of a weighted sum value $\Sigma\alpha_t h_t(x)$ (=$\alpha_1 h_1(x)+\alpha_2 h_2(x)+ \ldots +\alpha_T h_T(x)$), which is obtained through weighting of the t-th weak classifier $h_t(x)$ by using as a reliability degree $\alpha_t$ of the t-th weak classifier as a weight, as the classification result that the image is the positive image or the negative image, like the stump classifier described with reference to FIG. 7.

The ensemble learning of the classifier having the joint classifier as the weak classifier can be performed also by, for example, AdaBoost. Therefore, the threshold values $th_q$ of each element function $h_{q,t}(x)$, the reliability degree $\alpha_t$, and the LUT to which the 1-bit class is assigned in the divisions, into which the plurality of features X is classified, are calculated as the parameters of the weak classifier $h_t(x)$.

Since the joint classifier outputs one weak hypothesis in regard to the plurality of features such as three features, a plurality of image patterns can simultaneously be evaluated compared to the stump classifier outputting one weak hypothesis in regard to one feature. Further, narrowing specific image patterns (for example, aborting product calculation of the weak hypotheses from an abortion threshold described below) can be performed early.

The parameters of the joint classifier $h_t(X)$ include the threshold value $th_q$ of each element function $h_{q,t}(x)$, the reliability degree $\alpha_t$, and the LUT to which the 1-bit class is assigned in the division of the plurality of features X, as described above. Since the parameters necessary for the processing of the plurality of features are simpler than those of the stump classifier in FIG. 7, a memory storing the parameters may have a smaller capacity.

That is, when three features are processed using the joint classifier $h_t(X)$ as the weak classifier, the threshold values $th_1$, $th_2$, and $th_3$ of the three element functions $h_{1,t}(x)$, $h_{2,t}(x')$, and $h_{3,t}(x")$, one reliability degree $\alpha_t$, and the 8-bit LUT are necessary as the parameters of the joint classifier $h_t(X)$.

On the other hand, when three features are processed using the stump classifier $h_t(x)$ as the weak classifier, one threshold value and one reliability degree are necessary for each of three stump classifiers as the parameters of the stump classifier $h_t(x)$. That is, three thresholds and three reliability degrees are necessary in total.

Accordingly, when it is assumed that, for example, 8 bits, 16 bits, or the like, which is a value equal to or greater than 8 bits, can be assigned to the threshold value and the reliability degree, the joint classifier $h_t(x)$ has the LUT. However, since only one reliability degree is necessary in regard to three features, a memory storing the parameters may have a smaller capacity compared to the stump classifier for which three reliability degrees are necessary although the stump classifier has no LUT.

Classifier Having Regression Stump Classifier as Weak Classifier

Figure 9:
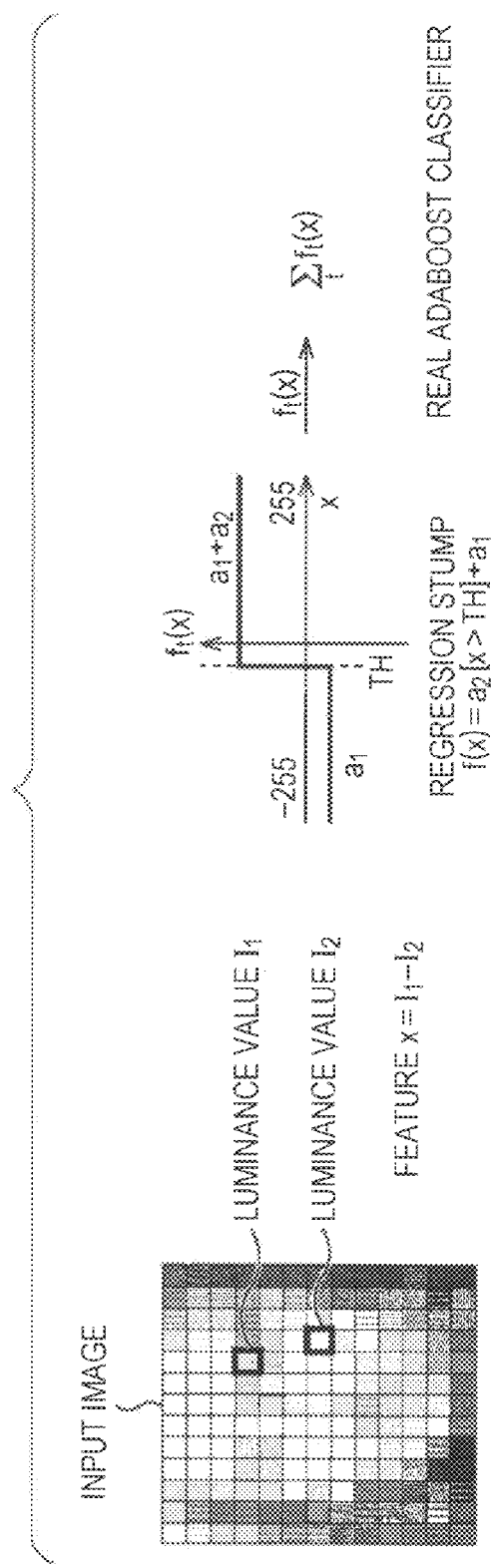
FIG. 9 is a diagram of a classifier having a regression stump classifier.

FIG. 9 is a diagram of a classifier having a regression stump classifier as the weak classifier.

A regression stump classifier $f_t(x)$ is the same as the stump classifier $h_t(x)$ described with reference to FIG. 7 in that the regression stump classifier $f_t(x)$ outputs the weak hypothesis in accordance with the magnitude relation between the feature x and the threshold value TH.

However, in the stump classifier $h_t(x)$, the same reliability degree $\alpha_t$, is multiplied any weak hypothesis since −1 is output as the weak hypothesis when the feature x is equal to or less than threshold value TH, whereas +1 is output when the feature x is greater than the threshold value TH. On the contrary, in the regression stump classifier $f_t(x)$, a value (real number) $a_1$ is output as the weak hypothesis when the feature x is equal to or less than the threshold value TH, whereas a value (real number) $a_1+a_2$ is output as the weak hypothesis when the feature x is greater than the threshold value TH. Accordingly, the regression stump classifier $f_t(x)$ is different from the stump classifier $h_t(x)$.

That is, the regression stump classifier $f_t(x)$ outputs, as the weak hypothesis, a value obtained by multiplying the weak hypothesis of −1 or +1 output by the stump classifier $h_t(x)$ by the reliability degree at.

However, in the regression stump classifier $f_t(x)$, different reliability degrees can be used when the feature x is equal to or less than the threshold value TH and when the feature is greater than the threshold value TH. That is, the reliability degree $a_1$ can be used when the feature x is equal to or less than the threshold value TH, whereas the reliability degrees $a_1+a_2$ can be used when the feature is greater than the threshold value TH. As a consequence, an error can be made smaller in the regression stump classifier $f_t(x)$ than in the stump classifier $h_t(x)$ described with reference to FIG. 7.

The regression stump classifier $f_t(x)$ (the weak hypothesis output by the regression stump classifier $f_t(x)$) is expressed by Expression (3).

$$f_t(x)=a_2\times[x>TH]+a_1 \qquad (3)$$

In this expression, as described in Expression (2), x becomes 1 when an expression of "x>TH" is satisfied, whereas x becomes 0 when the expression "x>TH" is not satisfied.

When "$a_1=a_2=\alpha_t$" is set in the regression stump classifier $f_t(x)$ of Expression (3), the regression stump classifier $f_t(x)$ functions as the stump classifier $h_t(x)$.

In the classifier having the regression stump classifier as the weak classifier, the t-th weak classifier $f_t(x)$ outputs one of the two values of $a_1$ and $a_1+a_2$ in accordance with the magnitude relation between the feature x and the threshold value TH, as described above.

That is, when the feature x is equal to or less than threshold value TH, that is, when the feature x is classified as a division expressed as an expression of "x≤TH", $a_1$ is output as the weak hypothesis $f_t(x)$. When the feature x is greater than the threshold value TH, that is, when the feature x is classified as a division expressed as an expression of "x>TH", $a_1+a_2$ is outputs as the weak hypothesis $f_t(x)$.

Here, $a_1$ and $a_1+a_2$ output as the weak hypothesis $f_t(x)$ by the regression stump classifier $f_t(x)$ and $a_1$ and $a_2$ constituting $a_1$ and $a_1+a_2$ correspond to the reliability degree $\alpha_t$ multiplexed to the stump classifier $h_t(x)$, and thus are referred to as a reliability degree.

Further, $a_1$ can be referred to as the reliability degree assignable to the division expressed as the expression of "x≤TH" and $a_1+a_2$ can be referred to as the reliability degree assignable to the division expressed as the expression of "x>TH."

Thereafter, the classifier having the regression stump classifier as the weak classifier outputs the sign of a sum value $\Sigma f_t(x)$ (=$f_1(x)+f_2(x)+\ldots+f_T(x)$), which is obtained through weighting (weighting majority decision) of each weak classifier $f_t(x)$, as the final hypothesis that the image is the positive image or the negative image, like the stump classifier described with reference to FIG. 7.

As described above, the ensemble learning of the classifier having the regression stump classifier as the weak classifier can be performed by, for example, Real AdaBoost which is a kind of boosting. Therefore, the threshold value TH and the two reliability degrees $a_1$ and $a_2$ are calculated as the parameters of the weak classifier $f_t(x)$.

When the sum value $\Sigma f_t(x)$ is calculated for the reliability degree $a_1$ of two reliability degrees $a_1$ and $a_2$, the sum of the reliability degrees $a_1$ of all the regression stump classifiers $f_t(x)$ of the classifier can be calculated and stored in advance. In this case, the parameters to be stored in advance as the parameters of one regression stump classifier $f_t(x)$ are the threshold value TH and one reliability degree $a_2$, and thus are the same as the parameters of the stump classifier $h_t(x)$ described with reference to FIG. 7.

Classifier Having Plural Threshold Classifier as Weak Classifier

Figure 10:
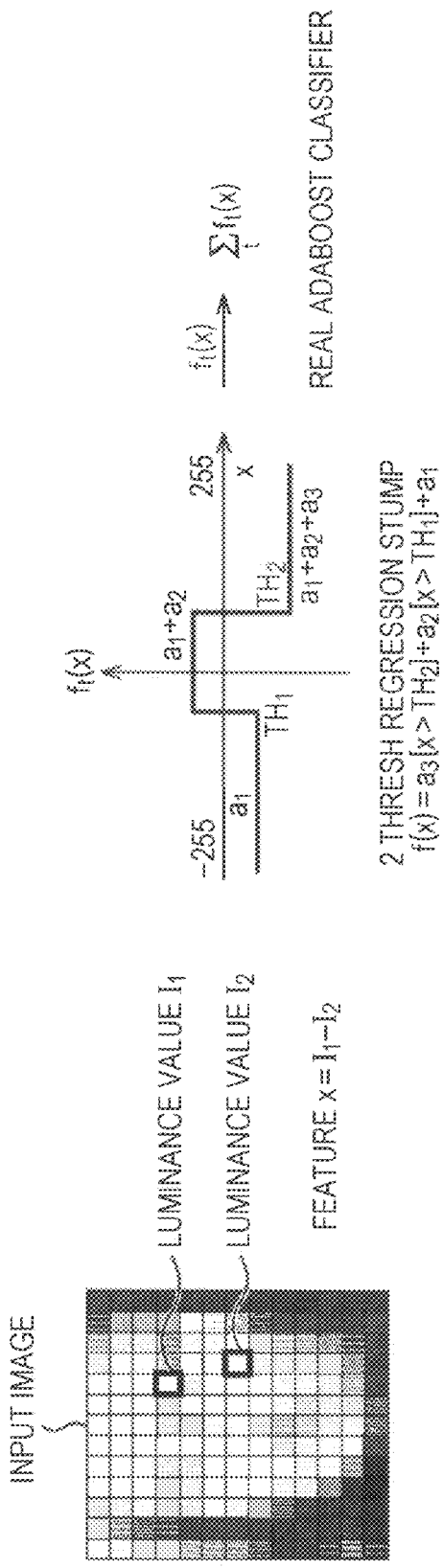
FIG. 10 is a diagram of a classifier having a plural-threshold classifier.

FIG. 10 is a diagram of a classifier having a plural-threshold classifier as the weak classifier.

The regression stump classifier described with reference to FIG. 9 outputs the weak hypothesis using one threshold value, but the weak classifier can output the weak hypothesis using at least two threshold values.

The plural-threshold classifier in FIG. 10 is a weak classifier which is an extension classifier of the regression stump classifier described with reference to FIG. 9 so as to use a plurality of threshold values.

A plural-threshold classifier $f_t(x)$ in FIG. 10 is the same as the regression stump classifier $f_t(x)$ described with reference to FIG. 9 in that the plural-threshold classifier $f_t(x)$ outputs the reliability degree as the weak hypothesis in accordance with the magnitude relation between the feature x and the threshold value TH.

In the regression stump classifier $f_t(x)$ described with reference to FIG. 9, the feature x is classified to one of the two divisions expressed as the expression of "x≤TH" and expressed as the expression of "x>TH" and the reliability degrees $a_1$ or $a_1+a_2$ assignable to the divisions of the feature x are output as the weak hypothesis $f_t(x)$ using one threshold value TH. However, the plural-threshold classifier $f_t(x)$ is different from the regression stump classifier $f_t(x)$ in that in the plural-threshold classifier $f_t(x)$, the feature is classified, using the plurality of threshold values, to one of at least three divisions corresponding to the plurality of threshold values and the reliability degree assignable to the division of the feature x is output as weak hypothesis $f_t(x)$.

In the plural-threshold classifier $f_t(x)$ of FIG. 10, the feature x is classified to one of the division expressed as an expression of "x≤$TH_1$", the division expressed as an expression of "$TH_1$<x≤$TH_2$", and the division expressed as an expression of "$TH_2$<x" by the use of two threshold values $TH_1$ and $TH_2$.

In FIG. 10, it is assumed that a reliability degree $a_1$ can be assigned to the division expressed as an expression of "x≤$TH_1$", a reliability degree $a_1+a_2$ can be assigned to the division expressed as an expression of "$TH_1$<x≤$TH_2$", and a reliability degree $a_1+a_2+a_3$ can be assigned to the division expressed as an expression of "$TH_2$<x." Accordingly, when the feature x is classified to the division expressed as an expression of "x≤$TH_1$", the plural-threshold classifier $f_t(x)$ outputs the reliability degree $a_1$ as the weak hypothesis $f_t(x)$. When the feature x is classified to the division expressed as an expression of "$TH_1$<x≤$TH_2$", the plural-threshold classifier $f_t(x)$ outputs the reliability degree $a_1+a_2$ as the weak hypothesis $f_t(x)$. When the feature x is classified to the division expressed as an expression of "$TH_2$<x", the plural-threshold classifier $f_t(x)$ outputs the reliability degree $a_1+a_2+a_3$ as the weak hypothesis $f_t(x)$.

Accordingly, the plural-threshold classifier $f_t(x)$ (the weak hypothesis output by the plural-threshold classifier $f_t(x)$) is expressed as Expression (4)

$$f_t(x) = a_3 \times [x>TH_2] + a_2 \times [x>TH_1] + a_1 \quad (4)$$

The classifier having the plural-threshold classifier as the weak classifier outputs the sign of a sum value $\Sigma f_t(x)$ (=$f_1(x)+f_2(x)+\ldots+f_T(x)$), which is obtained through sum (weighting majority decision) of the weak classifiers $f_t(x)$, as the final hypothesis that the image is the positive image or the negative image, like the stump classifier described with reference to FIG. 7.

As described above, the ensemble learning of the classifier having the plural-threshold classifier as the weak classifier can be performed by, for example, Real AdaBoost, like the regression stump classifier described with reference to FIG. 9. Therefore, the threshold values $TH_1$ and $TH_2$ and the three reliability degrees $a_1$ to $a_3$ are calculated as the parameters of the weak classifier $f_t(x)$.

When the sum value $\Sigma f_t(x)$ is calculated for the reliability degree $a_1$ of two reliability degrees $a_1$ to $a_3$, the sum of the reliability degrees $a_1$ of all the plural-threshold classifiers $f_t(x)$ of the classifier can be calculated and stored in advance. In this case, the parameters to be stored in advance as the parameters of one plural-threshold classifier $f_t(x)$ are the threshold values $TH_1$ and $TH_2$ and two reliability degrees $a_2$ and $a_3$. Therefore, one threshold value and one reliability degree are increased compared to the parameters of the regression stump classifier $f_t(x)$ described with reference to FIG. 9.

However, one plural-threshold classifier $f_t(x)$ functions as substantially two regression stump classifiers $f_t(x)$ with one threshold value.

Further, the plural-threshold classifier $f_t(x)$ is more efficient since the plural-threshold classifier $f_t(x)$ has the number of parameters smaller than that of the piecewise function.

Classifier Having New Weak Classifier as Weak Classifier

Figure 11:
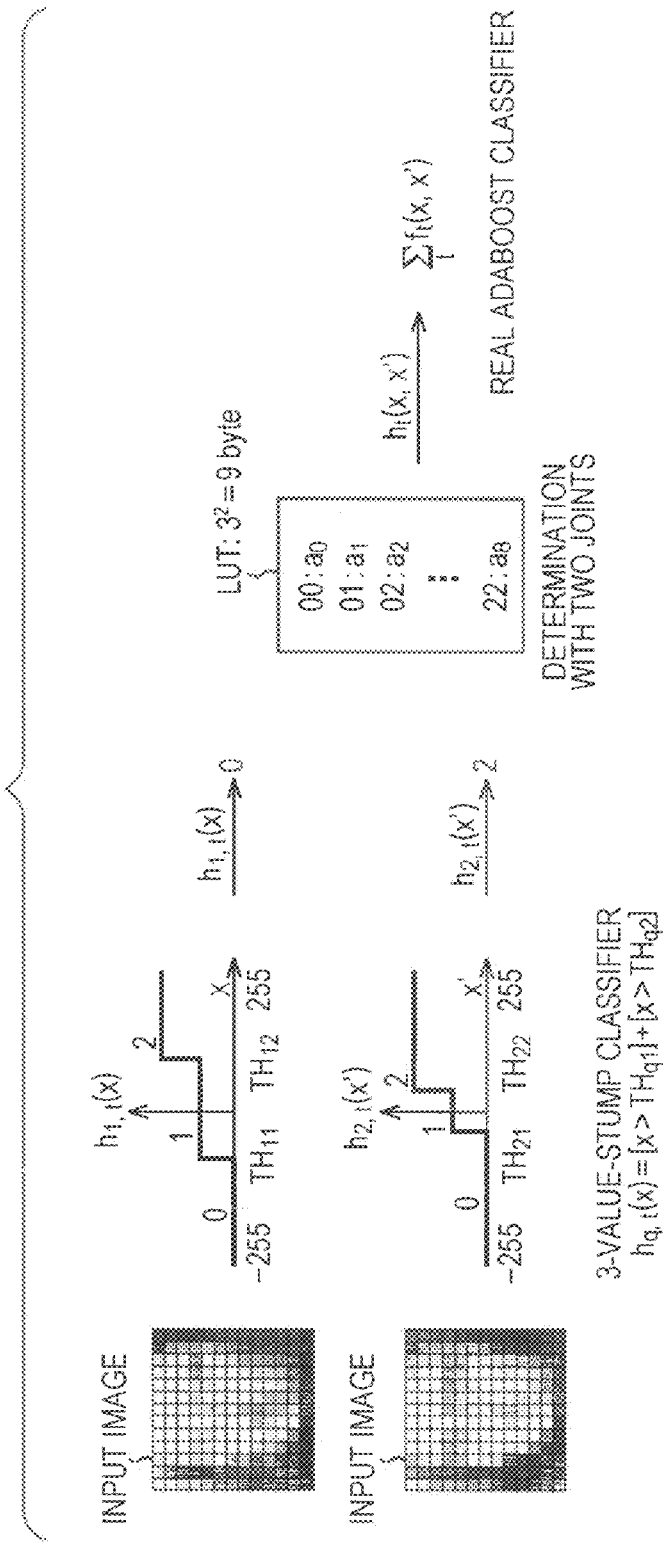
FIG. 11 is a diagram of a classifier having a new weak classifier.

FIG. 11 is a diagram of a classifier having a new weak classifier as the weak classifier.

Here, the classifier having the new weak classifier can be calculated by the ensemble learning performed by the learning unit 15 in FIG. 1. The ensemble learning performed by the learning unit 15 in FIG. 1 is a learning which is performed using boosting such as Real AdaBoost or Gentle Boost and is also referred to as new ensemble learning below.

Hereinafter, the classifier calculated by the new ensemble learning is also referred to as an ensemble classifier and the weak classifier forming the ensemble classifier is also referred to as a new weak classifier.

Like the joint classifier described with reference to FIG. 8, the new weak classifier has a plurality of functions (element functions) which is the same as those of the stump classifier and outputs one weak hypothesis in response to inputs of the plurality of features which is the same number of element functions.

In FIG. 11, two features are input as the plurality of features to the new weak classifier. The new weak classifier has two element functions (joints) which are the element functions of the same number as the number of Q features, that is, two features input thereto. The two features can be provided with the corresponding element functions.

That is, the new weak classifier $f_t(X=(x, x'))$ is provided with the two features $X=(x, x')$ in FIG. 11. Further, as in the case of FIG. 8, when the element function provided with the q-th feature x among the plurality of features is indicated by $h_{q,t}(x)$ in the t-th new weak classifier $f_t(x)$ included in the ensemble classifier, the new weak classifier $f_t(X=(x, x'))$ has two element functions $h_{1,t}(x)$ and $h_{2,t}(x')$.

The element function $h_{q,t}(x)$ outputs one of three or more values in accordance with the magnitude relation between the feature x provided (input) thereto among the plurality of features X and the plurality of threshold values.

That is, in FIG. 11, the element function $h_{q,t}(x)$ classifies the feature x to one of three divisions, that is, the division expressed as an expression $x \leq TH_{q1}$, the division expressed as an expression $TH_{q1} < x \leq TH_{q2}$, and the division expressed as an expression $TH_{q2} < x$ by the use of two threshold values $TH_{q1}$ and $TH_{q2}$.

In FIG. 11, 0 which is a value (integer number) indicating the division expressed as the division expressed as the expression $x \leq TH_{q1}$ can be assigned to this division, 1 which is a value indicating the division expressed as the expression $TH_{q1} < x \leq TH_{q2}$ can be assigned to this division, and 2 which is a value indicating the division expressed as the expression $TH_{q2} < x$ can be assigned to this division. Therefore, the element function $h_{q,t}(x)$ outputs one of three values 0, 1, and 2 as the division (value indicating the division) of the feature x.

Here, the element functions $h_{q,t}(x)$ can be expressed as Expression (5).

$$h_{q,t}(x)=[x>TH_{q2}]+[x>TH_{q1}] \quad (5)$$

The new weak classifier $f_t(X=(x, x'))$ outputs a value obtained by adding the divisions output by the element functions $h_{q,t}(x)$ of the new weak classifier $f_t(X=(x, x'))$ as a division for classifying all the plurality of features $X=(x, x')$.

That is, when the divisions into which all the plurality of features $X=(x, x')$ are classified are referred to as whole divisions, the divisions into which the features x output by the element functions $h_{q,t}(x)$ are classified are sub-divisions and the feature input to the element function $h_{q,t}(x)$ among the plurality of features X is referred to as $x(q)$, the element function $h_{q,t}(x)$ calculates and outputs the sub-division of a feature $x^{(q)}$ in accordance with the magnitude relation between the feature $x^{(q)}$ input to the element function $h_{q,t}(x)$ of two features $X=(x^{(1)}, x^{(2)})$ and the two threshold values $TH_{q1}$ and $TH_{q2}$ in FIG. 11.

Further, the new weak classifier $f_t(X=(x^{(1)}, x^{(2)}))$ joints the sub-divisions output by element functions $h_{1,t}(x^{(1)})$ and $h_{2,t}(x^{(2)})$ of the new weak classifier $f_t(X)$, that is, for example, lines up the sub-divisions (values indicating the sub-divisions) output by the element functions $h_{1,t}(x^{(1)})$ and $h_{2,t}(x^{(2)})$, and then outputs the values of the lined sub-divisions as the whole division for classifying both of the two features $X=(x^{(1)}, x^{(2)})$.

Accordingly, the new weak classifier $f_t(X)$ can classify the two elements $X=(x, x')=(x^{(1)}, x^{(2)})$ into the whole divisions of $9=3^2$ combinations by jointing (combining) the sub-divisions of three values of each of the element functions $h_{1,t}(x=x^{(1)})$ and $h_{2,t}(x'=x^{(2)})$.

The new weak classifier $f_t(X)$ has an LUT (hereinafter, also referred to as a reliability degree LUT), to which a reliability degree $a_j$ is assigned, for each of the whole divisions of the above-described 9 combinations other than the element function $h_{q,t}(x)$.

Here, the reliability degree $a_j$ is the reliability degree of the whole divisions j. When the sub-divisions output by the element functions $h_{1,t}(x^{(1)})$ and $h_{2,t}(x^{(2)})$ are referred to as $j_1$ and $j_2$, respectively, the whole divisions j can be expressed in additions of the sub-divisions $j_1$ and $j_2$ and thus can be expressed as an expression $j=3 \times j_1+j_2$ as a decimal number.

When one reliability degree $a_j$ is expressed with, for example, one byte, the reliability degree LUT of the new weak classifier $f_t(X)$ is a table to which the reliability degree $a_j$ expressed with one byte for the whole divisions of the 9 combinations can be assigned and has an 8-byte capacity.

That is, in the reliability degree LUT of the new weak classifier $f_t(X)$, the 1-byte reliability degree $a_j$ assignable to the whole divisions are registered to addresses corresponding to the whole divisions of the 9 combinations.

The new weak classifier $f_t(X)$ outputs the 1-byte reliability degree $a_j$ assignable to the whole divisions j into which all the two features $X=(x, x')$ are classified in the 8-byte reliability degree LUT as the weak hypothesis.

The ensemble classifier having the new weak classifier as the weak classifier outputs the sign of a sum value $\Sigma f_t(x)(=f_1(x)+f_2(x)+ \ldots +f_T(x)$ (where the plurality of features X are different from each other for each new weak classifier)), which is obtained through sum (weighting majority decision) of the weak hypotheses $f_t(x)$, as the final hypothesis that the image is the positive image or the negative image.

As described, the ensemble learning of the ensemble classifier having the new weak classifier as the weak classifier can be performed by a new ensemble learning described below by the use of, for example, Real AdaBoost. Therefore, the threshold values $TH_{q1}$ and $TH_{q2}$ of the element functions $h_{q,t}(x)$ and the reliability degree LUT to which the 1-byte reliability degree $a_j$ is assigned to the whole divisions to which the plurality of features X is classified are calculated as the parameters of the new weak classifier $f_t(X)$.

The joint classifier $h_t(x)$ described with reference to FIG. 8 classifies the plurality of features, that is, three features $X=(x, x', x'')$ into one of the 8 combinations, digitalizes the divisions of the three features by the use of the LUT, to which one of two classes, that is, the class indicating the positive image and the class indicating the negative image is assigned, to +1 indicating the class of the positive image or −1 indicating the class of the negative image in the 8 combinations, and outputs the result as the weak hypothesis.

Accordingly, in the joint classifier $h_t(x)$, a lot of information is lost since the digitalized values are output as the weak hypotheses in regard to the plurality of features, that is, three features X (included in the three features X).

On the other hand, the new weak classifier $f_t(X)$ classifies the plurality of features, that is, two features X into one of three (or more) sub-divisions in accordance with two (or more) threshold values and calculates the divisions j obtained by adding the respective sub-divisions of the two features as the whole divisions into which the two features X are classified. Further, the reliability degree $a_j$ of the whole divisions j which is assignable to the whole divisions j in the reliability degree LUT is output as the weak hypothesis.

Accordingly, since the new weak classifier $f_t(X)$ outputs one value of the same number as the total number of whole divisions as the weak hypothesis in regard to the plurality of features, that is, two features X, the information can be prevented from being lost in the joint classifier $h_t(X)$.

Further, since the number of parameters of the new weak classifier $f_t(X)$ classifying each feature into three sub-divisions and processing two features X are 13=2+2+9 in total, that is, two threshold values $TH_{11}$ and $TH_{12}$ of the element function $h_{1,t}(x)$ in FIG. 11, two threshold values $TH_{21}$ and $TH_{22}$ of the element function $h_{2,t}(x)$, and nine reliability degrees $a_j$ registered in the reliability degree LUT, it is necessary to store 6.5=13/2 parameters in regard to one feature.

On the other hand, like the new weak classifier $f_t(X)$ described with respect to FIG. 11, it is necessary to store four parameters in total, that is, the threshold values $TH_1$ and $TH_2$ and two reliability degrees $a_1$ and $a_2$, as described with reference to FIG. 10, as the parameters of the plural-threshold classifier of FIG. 10 classifying one feature into three divisions.

Accordingly, when the parameters are calculated in regard to one feature, it is necessary to store 6.5 parameters for the new weak classifier $f_t(X)$ and it is necessary to store 4 parameters for the plural-threshold classifier. Therefore, since the number of parameters of the new weak classifier $f_t(X)$ is larger than the number of parameters of the plural-threshold classifier by 2.5=6.5−4, the capacity of the memory storing the parameters of the new weak classifier $f_t(X)$ is accordingly increased.

However, the capacity of the memory storing the parameters of the new weak classifier $f_t(X)$ can be reduced by reducing the number of bits expressing the parameters of the new weak classifier $f_t(X)$ less than the number of parameters of the bits expressing the plural-threshold classifier, that is, expressing the parameters of the new weak classifier $f_t(X)$ with, for example, a byte (8 bits) when the parameters of the plural-threshold classifier are expressed with, for example, a so-called short (16 bits).

As described above, the new weak classifier $f_t(X)$ has the element function $h_{q,t}(x)$ of the same number as the number of Q features input to the new weak classifier $f_t(X)$ and the reliability degree LUT to which the reliability degree $a_j$ is assigned to each of the whole divisions j into which all the plurality of features is classified.

The element function $h_{q,t}(x)$ classifies the feature input to the element function $h_{q,t}(x)$ among the plurality of features into three (or more) sub-divisions in accordance with two (or more) threshold values the new weak classifier $f_t(X)$ calculates the divisions which are the sum of the sub-divisions of the plurality of features as the whole divisions j into which the plurality of features is classified.

Further, the new weak classifier $f_t(X)$ outputs, as the weak hypothesis, the reliability degree $a_j$ of the whole divisions j assignable to the whole divisions j of the plurality of features in the reliability degree LUT.

Accordingly, the new weak classifier $f_t(X)$ processes the plurality of features. However, since the loss of the information included in the plurality of features is suppressed compared to the joint classifier of FIG. 8 outputting the digitalized weak hypotheses, the subject can be distinguished with very high performance.

Further, the new weak classifier $f_t(X)$ can suppress the lost of the information included in the plurality of features, that is, can efficiently extract and utilize the information included in the plurality of features, even when the number of plurality of features is small. Thus, the new weak classifier $f_t(X)$ can distinguish the subject with high performance.

That is, the new weak classifier $f_t(X)$ can distinguish the subject with a smaller number of features.

Since the number of features used to distinguish the subject is small, the number of times of access to the memory storing an image is small in the calculation of the features. Therefore, the subject can be distinguished at high speed with high performance.

In this embodiment of the disclosure, since the inter-pixel difference feature calculated only by the subtraction is used as each of the plurality of features, the plurality of features can be calculated at high speed. As a consequence, the subject can be distinguished at high speed.

Thus, since the ensemble classifier using the inter-pixel difference feature as the feature and having the new weak classifier $f_t(X)$ can distinguish the subject at high speed and with high performance, for example, the ensemble classifier is useful for a TV (television) which has, for example, a function of switching an operation mode by detecting whether a user is present.

That is, in the TV having the function of switching the operation mode by detecting whether the user is present, when the operation mode is a normal mode of outputting an image and an audio of a program and no user is detected, the operation mode can be switched to a power-saving mode of outputting no image and no audio of the program. When the operation mode is the power-saving mode and the user is detected, the operation mode can be switched to the normal mode.

In this case, in the TV, particularly, the user may feel a sense of discomfort, when the user returns to the front of the TV but the operation mode is not quickly switched to the normal mode after the user is away from the TV and thus the operation mode is switched to the power-saving mode.

In order to quickly switch the operation mode from the power-saving mode to the normal mode so that the user does not feel the sense of discomfort, it is necessary to distinguish a subject such as a human face at high speed and with high performance. Here, the ensemble classifier using the inter-pixel difference feature as the feature and having the new weak classifier $f_t(X)$ can distinguish the subject at high speed and with high performance.

New Ensemble Learning

Figure 12:
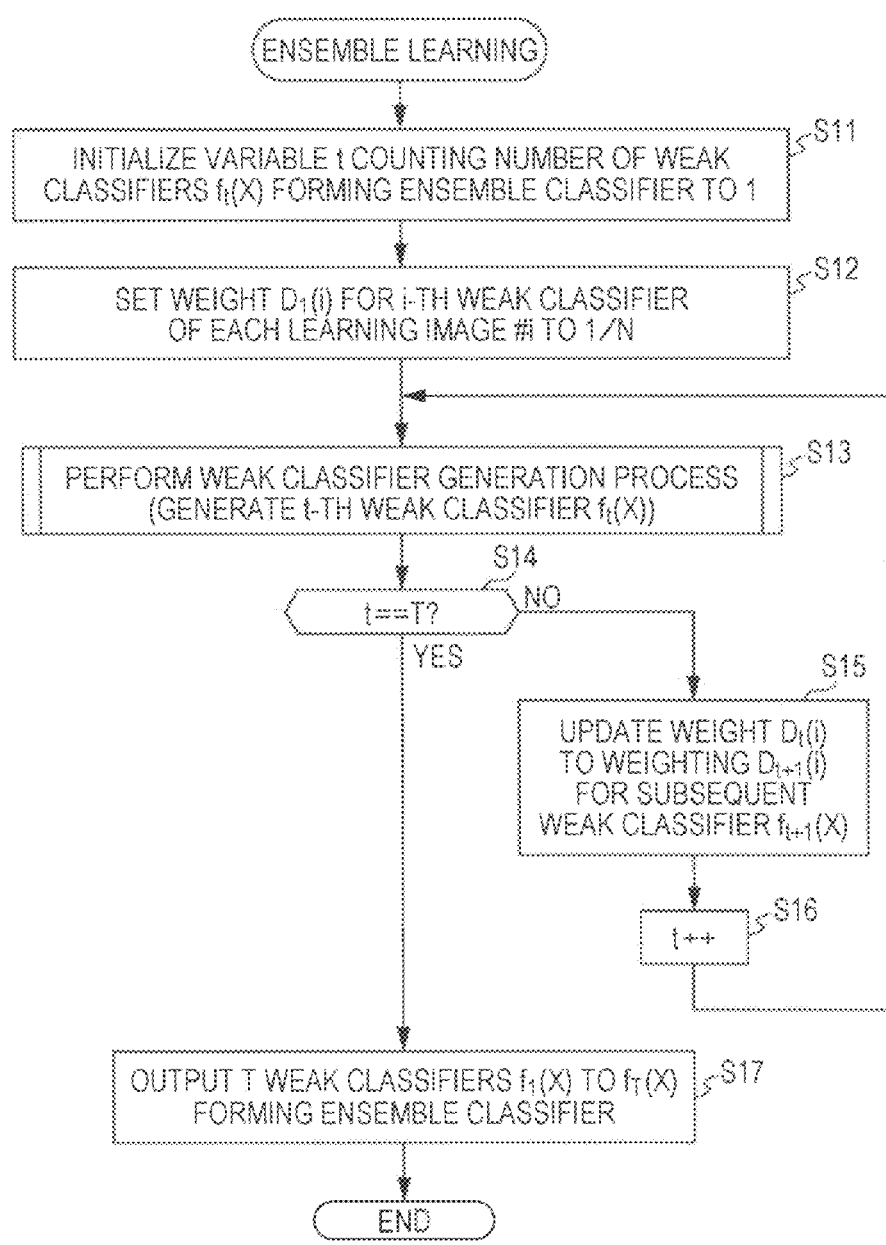
FIG. 12 is a flowchart of a new ensemble learning process.

FIG. 12 is a flowchart of the ensemble learning (new ensemble learning), which is performed by the learning unit 15 in FIG. 1, of the ensemble classifier having the new weak classifier $f_t(X)$.

The new ensemble learning in FIG. 12 is a learning of using Real AdaBoost. However, the new ensemble learning can be performed using an ensemble learning (an ensemble learning of using weighing majority decision) such as Gentle Boost other than Real AdaBoost.

In this embodiment, it is assumed that two features $X=(x, x')=(x^{(1)}, x^{(2)})$ are input as the plurality of features X into the new weak classifier $f_t(X)$ forming the ensemble classifier by using the inter-pixel features as the features.

Accordingly, the new weak classifier $f_t(X)$ has two element functions, that is, the element function $h_{q,t}(x)$ into which the first feature x is input between the two features X and the element function $h_{q,t}(x')$ into which the second feature x' is input.

In this embodiment, it is assumed that the element function $h_{q,t}(x)$ has the two threshold values $TH_{q1}$ and $TH_{q2}$ to classify the feature x to one of, for example, three sub-divisions as the three or more sub-divisions.

In this case, in the new weak classifier $f_t(X)$, the whole divisions j into which all the two features X are classified in addition to the sub-divisions output from each of the two element functions $h_{1,t}(x)$ and $h_{2,t}(x')$ are $9=3^2$ combinations, as described with reference to FIG. 11. The reliability degrees $a_j$ assignable to each of the whole divisions j of the 9 combinations, that is, nine reliability degrees $a_0$, $a_1$, $a_2$, $a_3$, $a_4$, $a_5$, $a_6$, $a_7$, and $a_8$ are registered in the reliability degree LUT that the new weak classifier $f_t(X)$ has.

Accordingly, the parameters of the new weak classifier $f_t(X)$ include the pixel positions (a pair of pixel positions) $P_{11}$ and $P_{12}$ of two pixels used to calculate the inter-pixel difference feature as the first feature x of the two features X, a pair of pixel positions $P_{21}$ and $P_{22}$ of two pixels used to calculate the inter-pixel difference feature as the second feature x', the two threshold values $TH_{11}$ and $TH_{12}$ of the first element function $h_{1,t}(x)$, the two threshold values $TH_{21}$ and $TH_{22}$ of the second element function $h_{2,t}(x')$, and the nine reliability degrees $a_0$ to $a_8$ registered in the reliability degree LUT.

In this embodiment, the integration is performed for operating the weighting majority decision (total sum) of the weak hypothesis $f_t(X)$ which is the output of the new weak classifier $f_t(X)$ in the process of distinguishing the subject. However, in the new ensemble learning described with reference to FIG. 12, the abortion threshold value $R_t$ used to determine whether the integration is aborted is calculated as the parameter of the new weak classifier $f_t(X)$.

Accordingly, in the new ensemble learning described with reference to FIG. 12, the four kinds of parameters, that is, the pairs of pixel positions $(P_{11}, P_{12})$ and $(P_{21}, P_{22})$, the threshold values $(TH_{11}, TH_{12})$ and $(TH_{21}, TH_{22})$, the reliability degrees $a_0$ to $a_8$, and the abortion threshold value $R_t$ are calculated as the parameters of one new weak classifier $f_t(X)$.

In the new ensemble learning, a plurality of learning images is input into the learning unit 15 (see FIG. 1).

As described in FIG. 1, the learning image is an image which has the same size as that of the window used in the scanning unit 12 (see FIG. 1). The plurality of learning images includes the positive image in which the subject is shown and the negative image in which no subject is shown.

The negative image is an image in which any portion (landscape or the like) other than the subject is shown.

The accuracy label indicating that the learning image is one of the positive image and the negative image is annexed to each learning image, for example, by a hand work.

When a total number of plurality of learning images is N, the i-th learning image among the N learning images is indicated as a learning image #i. Further, the accuracy label of the i-th learning image is indicated by $y_i$.

In the new ensemble learning, in step S11, the learning unit 15 initializes a variable t counting the number of weak classifiers $f_t(X)$ forming the ensemble classifier to 1, and then the process proceeds to step S12.

In step S12, the learning unit 15 initializes weights $D_1(1)$ to $D_1(N)$ of learning images #1 to #N supplied to the learning unit 15 for the first weak classifier $f_1(X)$, for example, 1/N. Then, the process proceeds to step S13.

Here, $D_t(i)$ indicates the weight for the t-th new weak classifier $f_t(X)$ of the i-th learning image #i.

In step S13, the learning unit 15 performs the weak classifier generation process of generating the t-th the new weak classifier $f_t(X)$. Then, the process proceeds to step S14.

In step S14, the learning unit 15 determines whether the variable t is identical to a set total number T, which is a preset value, as the total number of the new weak classifiers $f_t(X)$ forming the ensemble classifier.

When the learning unit 15 determines that the variable t is not identical to the set total number T in step S14, that is, the new weak classifiers $f_1(X)$ to $f_t(X)$ of the same number as the set total number T are not yet generated, the process proceeds to step S15. Then, the learning unit 15 updates the weight $D_t(i)$ of each learning image #i for the t-th the new weak classifier $f_t(X)$ to the weight $D_{t+1}(i)$ of each learning image #i for the (t+1)-th new weak classifier $f_{t+1}(X)$ in accordance with an algorithm of, for example, Real AdaBoost.

That is, the learning unit 15 updates the weight $D_t(i)$ by Expression (6).

$$D_t(i)=D_t(i)\exp(-y_i f_t(X_i)) \qquad (6)$$

In Expression (6), exp( ) indicates an exponential function with a base of an exponential e and $y_i$ indicates the accuracy label of the i-th learning image #i.

Further, $X_i$ indicates a plurality of features (here, two inter-pixel difference features as two features) extracted from the i-th learning image #i and $f_t(X_i)$ indicates the weak hypothesis output in response to an input of two features $X_i$ by the t-th new weak classifier $f_t(X)$ generated immediately beforehand in step S13.

According to Expression (6), when the sign of the accuracy label $y_i$ is identical to the sign of the weak hypothesis $f_t(X_i)$ (when the weak hypothesis $f_t(X_i)$ is accurate), the weight $D_t(i)$ is updated to a small value. When the sign of the accuracy label $y_i$ is not identical to the sign of the weak hypothesis $f_t(X_i)$ (when the weak hypothesis $f_t(X_i)$ is not accurate), the weight $D_t(i)$ is updated to a large value.

Thereafter, the learning unit 15 normalizes the updated weight $D_t(i)$ by Expression (7) and calculates the normalized weight $D_t(i)$ as a weight $D_{t+1}(i)$ for the (t+1)-th new weak classifier $f_{t+1}(X)$.

$$D_t(i)=D_t(i)/\Sigma_i D_t(i) \qquad (7)$$

In Expression (7), $\Sigma_i$ indicates summation (the total sum of $D_t(i)$) of $D_t(i)$ taken by changing the variable i from 1 to N.

In step S15, the weight $D_{t+1}(i)$ of each learning image #i for the (t+1)-th new weak classifier $f_{t+1}(X)$ subsequently calculated is calculated, and then process proceeds to step S16. Then, the learning unit 15 increases the variable t by 1.

The process returns from step S16 to step S13 to reiterate the same process below.

On the other hand, when the learning unit 15 determines that the variable t is identical to the set total number T in step S14, that is, the new weak classifiers $f_1(X)$ to $f_t(X)$ of the same number as the set total number T are generated, the process proceeds to step S17. Then, the learning unit 15 outputs and stores the ensemble classifier formed by the new weak classifiers $f_1(X)$ to $f_t(X)$ (the parameters thereof) in the classifier storage unit 14 and the new ensemble learning process ends.

Weak Classifier Generation Process

Figure 13:
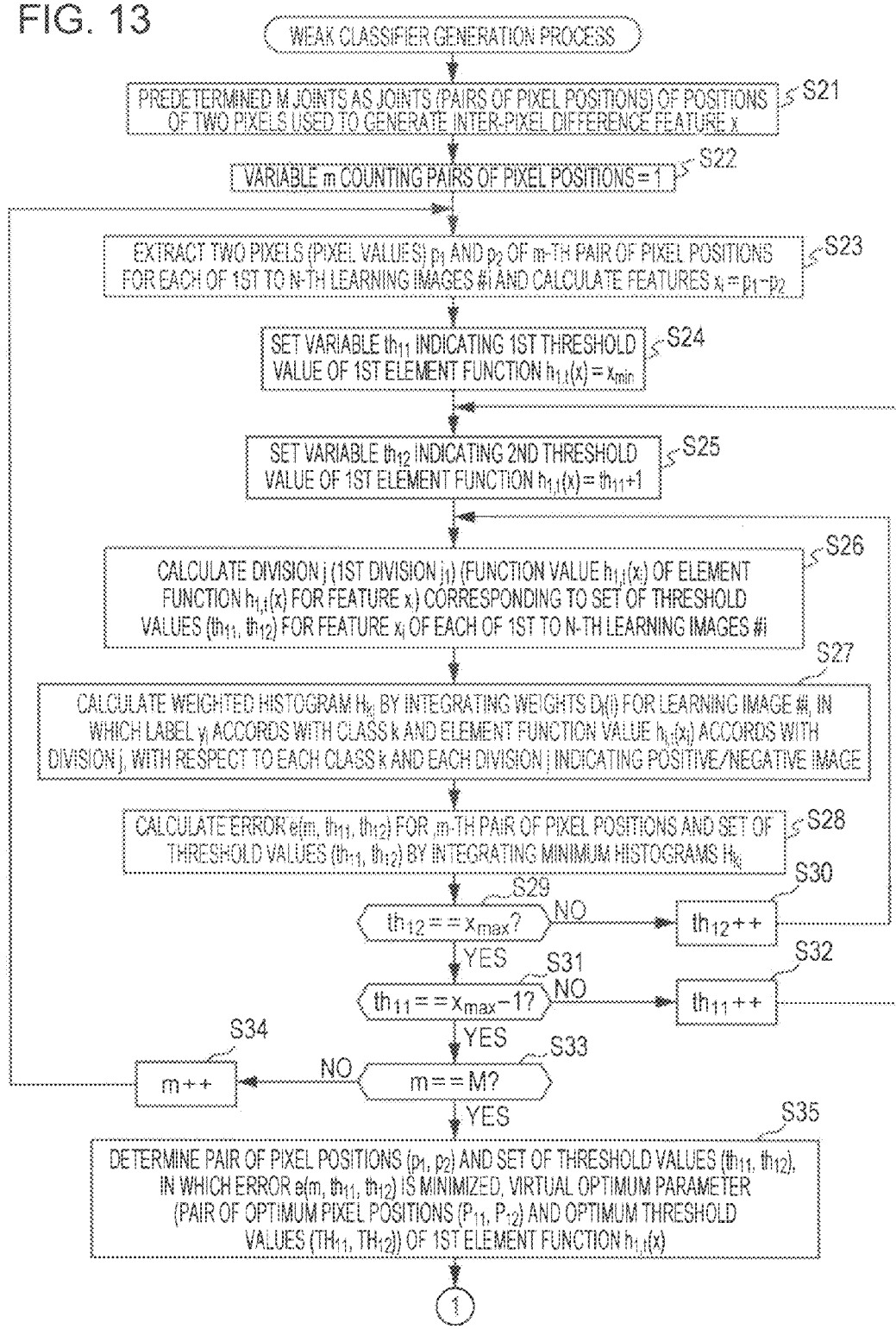
FIG. 13 is a flowchart of a weak classifier generation process.

FIG. 13 is a flowchart of a weak classifier generation process of generating the new weak classifier $f_t(X)$ in step S13 of FIG. 12 by the learning unit 15 in FIG. 1.

In step S21, the learning unit 15 sets the joints of a predetermined number M as the joints (pairs of pixel positions) of the positions of two pixels used to generate the inter-pixel difference features x as the features.

That is, the learning unit 15 generates the pairs of pixel positions of all the combinations to be acquired in a single learning image and selects the pairs of pixel positions of M combinations used for the weak classifier generation process from the pairs of pixel positions of all the combinations, for example, at random.

Here, when the pairs of pixel positions of all the combinations are equal to or less than M combinations, the pairs of pixel positions of all the combinations are selected as the pairs of pixel positions used for the weak classifier generation process and the predetermined number M is set as the number of pairs of pixel positions.

Further, the predetermined number M is set such that the weak classifier generation process ends within a given time based on the performance of the learning unit 15 and the calculation amount or the like necessary to perform the following process for the pairs of pixel positions of the M combinations.

When the pairs of pixel positions of the M combinations are selected (set) in step S21, the process proceeds to step S22. The learning unit 15 initializes a variable m counting the pairs of pixel positions of the M combinations to 1, and then the process proceeds to step S23.

In step S23, the learning unit 15 extracts the pixel values (for example, luminances) $p_1$ and $p_2$ of two pixels at an m-th pair of pixel positions among the pairs of pixel positions of the M combinations for the 1st to N-th learning images #1 to #N and calculates the feature $x_i=p_1-p_2$, which is the inter-pixel difference feature, as the first feature among the two features X provided with the t-th new weak classifier $f_t(X)$, and then the process proceeds to step S24.

In step S24, the learning unit 15 sets an initial value $x_{min}$ to a variable $th_{11}$ indicating a smaller threshold value (hereinafter, also referred to as the first threshold value) between two threshold values set in the first element function $h_{1,t}(x)$ of the two element functions $h_{1,t}(x)$ and $h_{2,t}(x)$ that the t-th new weak classifier $f_t(X)$ has, and then the process proceeds to step S25.

Here, as the initial value $x_{min}$, the minimum value or the like is used among the values of the inter-pixel difference features expressed with a predetermined number of bits such as 8 bits or 16 bits.

In step S25, the learning unit 15 sets an initial value $th_{11}+1$ to a variable $th_{12}$ indicating a larger threshold value (hereinafter, also referred to as a second threshold value) between the two threshold values set in the first element function $h_{1,t}(x)$ that the t-th new weak classifier $f_t(X)$ has, and then the process proceeds to step S26.

In step S26, the learning unit 15 calculates a sub-division $j(=j_1)$ of the feature $x_i$, which is a first function value $h_{1,t}(x_i)$ output in regard to the feature $x_i$ by the first element function $h_{1,t}(x)$, in regard to the first feature $x_i$ calculated from each learning image #i.

That is, the first element function $h_{1,t}(x)$ having the two threshold values $th_{11}$ and $th_{12}$ outputs one of three values 0, 1, and 2 in regard to the first feature $x_i$ based on the magnitude relation between the first feature $x_i$ and the threshold values $th_{11}$ and $th_{12}$.

Specifically, the element function $h_{1,t}(x)$ classifies the feature $x_i$ to one of three sub-divisions, that is, the sub-division expressed as the expression $x_i \leq th_{11}$, the sub-division expressed as the expression $th_{11} < x_i \leq th_{12}$, and the sub-division expressed as the expression $th_{12} < x_i$ by the use of the two threshold values $th_{11}$ and $th_{12}$.

Here, the sub-division expressed as the expression $x_i th_{11}$ can be assigned with 0, which is a value (integer value) indicating this sub-division, the sub-division expressed as the expression $th_{11} < x_i \leq th_{12}$ can be assigned with 1, which is a value indicating this sub-division, and the sub-division expressed as the expression $th_{12} < x_i$ is assigned with 2, which is value indicating this sub-division. The element function $h_{1,t}(x)$ outputs one of the three values 0, 1, and 2 as the sub-division (the value indicating the sub-division) of the feature $x_i$ based on the magnitude relation between the feature $x_i$ and the threshold values $th_{11}$ and $th_{12}$.

Hereinafter, the sub-division $j(=j_1)$ of the first feature $x_i$ output by the first element function $h_{1,t}(x)$ is also referred to as a first division.

Further, when the process of step S26 is performed for the t-th new weak classifier $f_t(X)$, the sub-division which is an output of the second element function $h_{2,t}(x)$ may not be calculated due to the fact that two threshold values of the second element function $h_{2,t}(x)$ are not yet set between the two element functions $h_{1,t}(x)$ and $h_{2,t}(x)$ which the t-th new weak classifier $f_t(X)$ has.

Furthermore, the entire divisions j, into which all the two features X=(x, x') as the plurality of features provided to the t-th new weak classifier $f_t(X)$ are classified, are the sum of the sub-divisions (first divisions) $j_1$ output by the first element function $h_{1,t}(x)$ and the sub-divisions $j_2$ output by the second element function $h_{2,t}(x')$. Therefore, in a stage in which the sub-divisions which are the outputs of the second element function $h_{2,t}(x)$ may not be calculated, the whole divisions j may not be calculated either.

In a stage in which the whole divisions j may not be calculated, that is, the element function of which no threshold values are set is present among the element functions $h_{q,t}(x)$ which the t-th new weak classifier $f_t(X)$ has, divisions calculated from the sub-divisions, which are the outputs of the element functions of which the threshold values are set in this stage, are assumed to be the whole divisions j to perform the process.

In a stage of performing step S26, since the element function of which the threshold values are set is only the first element function $h_{1,t}(x)$, the divisions are calculated from the first divisions $j_1$ of the feature $x_i$ output by the element function $h_{1,t}(x)$. For example, the first divisions $j_1$ themselves are assumed as the whole divisions j to perform the process.

When the first divisions $j_1$ of the feature $x_i$, that is, the whole divisions j are calculated in regard to the first feature $x_i$ of each learning image #i in step S26 (here, the whole divisions are the same as the first divisions $j_1$, as described above), the process proceeds to step S27. The learning unit 15 adds a weight to each class k and each whole division j to calculate a weighted histogram In this embodiment, the class in which the subject is shown and the class no subject is shown are used as the classes k. In other words, two classes, that is, the class in which the learning image #i indicates the positive image and the class in which the learning image #i indicates the negative image are used as the classes k.

The class k in which the learning image #i indicates the positive image is indicated by +1 and the class k in which the learning image #i indicates the negative image is indicated by −1.

The weighted histogram $H_{kj}$ is a weighted frequency of the learning image of the class k among the learning images #i in which the feature $x_i$ is classified into the whole divisions j and can be calculated using the weight $D_t(i)$ by Expression (8).

$$H_{kj}=\Sigma D_t(i) \qquad (8)$$

In Expression (8), $\Sigma$ indicates the summation of only the weights $D_t(i)$ of the learning image #i of the class k, which is divided into the whole divisions j in the weight $D_t(i)$.

When the weighted histogram $H_{kj}$ is calculated, the learning image #i of the class k is a learning image #i in which the accuracy label $y_i$ is identical to the class k and the whole divisions j of the learning image #i are the whole divisions j calculated from the feature of the learning image #i immediately previously in step S26.

By Expression (8), the integrated value of the weights $D_t(i)$ of the learning image #i of the class k, which is divided into the whole divisions j in the weight $D_t(i)$ is calculated as the weighted histogram $H_{kj}$ of the learning image of the class k, which is divided into the whole divisions j.

In step S27, the weighted histogram is calculated for each class k and each whole division j (in this embodiment, joints of k=−1 and +1 and j=0, 1, and 2). Then, the process proceeds to step S28. The learning unit 15 calculates an error $e(m, th_{11}, th_{12})$ of the t-th new weak classifier $f_t(X)$ having the first element function $h_{1,t}(x)$ for the m-th pair of pixel positions and the two threshold values $th_{11}$ and $th_{12}$ (hereinafter, also referred to as a set of threshold values ($th_{11}$ and $th_{12}$)) of the first element function $h_{1,t}(x)$ by the use of the weighted histogram $H_{kj}$ by Expression (9).

$$e(m, th_{11}, th_{12}) = \Sigma_j \min(H_{kj}) \quad (9)$$

In Expression (9), $\min_k(H_{kj})$ indicates the minimum weighted histogram $H_{kj}$ (here, $H_{-1j}$ or $H_{+1j}$) between weighted histograms $H_{-1j}$ and $H_{+1j}$ which are the weighted histogram of the whole divisions j.

In Expression (9), $\Sigma_j$ indicates the summation of the $\min_k$ ($H_{kj}$) taken by changing the variable j to 0, 1, and 2, which are values taken as the whole divisions j (which are the same as the first divisions $j_1$ here, as described above).

By Expression (9), the error $e(m, th_{11}, th_{12})$ of the t-th new weak classifier $f_t(X)$ having the first element function $h_{1,t}(x)$ in regard to the m-th pair of pixel positions and the set of threshold values ($th_{11}$ and $th_{12}$) is calculated by integrating the minimum weighted histogram $H_{kj}$ between the weighted histograms $H_{kj}$ of the respective classes k=−1 and +1 of the learning image #i which is divided into the whole divisions j, that is, a smaller one of the weighted histograms $H_{-1j}$ and $H_{+1j}$ for the whole divisions j=0, 1, and 2.

Here, the error $e(m, th_{11}, th_{12})$ of the t-th new weak classifier $f_t(X)$ having the first element function $h_{1,t}(x)$ indicates the extent that the weak hypothesis $f_t(X)$ output by the t-th new weak classifier $f_t(X)$ having the element function $h_{1,t}(x)$ is erroneous when the feature x obtained for the m-th pair of pixel positions is provided with (input into) the element function $h_{1,t}(x)$ having the threshold values $th_{11}$ and $th_{12}$.

In step S28, the error $e(m, th_{11}, th_{12})$ of the t-th new weak classifier $f_t(X)$ having the element function $h_{1,t}(x)$ is calculated and then, the process proceeds to step S29. The learning unit 15 determines whether the second threshold value $th_{12}$ of the first element function $h_{1,t}(x)$ is identical to the maximum value $x_{max}$ of the values taken as the inter-pixel difference feature expressed with the predetermined number of bits.

When the learning unit 15 determines whether the threshold value $th_{12}$ is not identical to the maximum value $x_{max}$ in step S29, that is, the threshold value $th_{12}$ is less than the maximum value $x_{max}$, the process proceeds to step S30. Then, the leaning unit 15 increases the threshold value $th_{12}$ by one.

The process returns from step S30 to step S26 to reiterate the same processes.

On the other hand, when the learning unit 15 determines that the threshold value $th_{12}$ is identical to the maximum value $x_{max}$ in step S29, the process proceeds to step S31. Then, the learning unit 15 determines whether the first threshold value $th_{11}$ of the first element function $h_{1,t}(x)$ is identical to the maximum value $x_{max}-1$.

When the learning unit 15 determines that the first threshold value $th_{11}$ is not identical to the maximum value $x_{max}-1$ in step S31, that is, the threshold value $th_{11}$ is less than the maximum $x_{max}-1$, the process proceeds to step S32. Then, the learning unit 15 increases the threshold value $th_{11}$ by one.

The process returns from step S32 to step S25 to reiterate the same processes.

On the other hand, when the learning unit 15 determines that the threshold value $th_{11}$ is identical to the maximum value $x_{max}-1$ in step S31, the process proceeds to step S33. Then, the learning unit 15 determines whether a variable m is identical to a predetermined number M.

When the learning unit 15 determines that the variable m is not identical to the predetermined number M in step S33, the process proceeds to step S34. Then, the learning unit 15 increases the variable m by one.

The process returns from step S34 to step S23 to reiterate the same processes.

On the other hand, when the learning unit 15 determines that the variable m is identical to the predetermined number M in step S33, that is, when the error $e(m, th_{11}, th_{12})$ of the t-th new weak classifier $f_t(X)$ is calculated for each of the pair of pixel positions of the M combinations and each of the set of threshold values ($th_{11}$ and $th_{12}$) of the ranges expressed as an expression $x_{min} \leq th_{11} \leq x_{max}-1$ and an expression $th_{11}+1 \leq th_{12} \leq x_{max}$, the process proceeds to step S35. Then, the learning unit 15 determines the pair of pixel positions ($P_{11}$ and $P_{12}$) and the set of threshold values ($TH_{11}$ and $Th_{12}$) for the first element function $h_{1,t}(x)$ as the virtual optimum parameters.

That is, in step S35, the learning unit 15 calculates the pair of pixel positions and the set of threshold values ($th_{11}$ and $th_{12}$) for which the error $e(m, th_{11}, th_{12})$ is minimized among the errors $e(m, th_{11}, th_{12})$ of the t-th new weak classifier $f_t(X)$ calculated for the pair of pixel positions of the M combinations and the set of threshold values ($th_{11}$ and $th_{12}$) of the ranges expressed as the expression $x_{min} \leq th_{11} \leq x_{max}-1$ and the expression $th_{11}+1 \leq th_{12} \leq x_{max}$, and then determines the pair of pixel positions and the set of threshold values ($th_{11}$ and $th_{12}$) as a pair of virtual optimum pixel positions (pair of optimum pixel positions) ($P_{11}$ and $P_{12}$) and a set of virtual optimum threshold values (set of optimum threshold values) ($TH_{11}$ and $TH_{12}$).

Here, the pair of virtual optimum pixel positions ($P_{11}$ and $P_{12}$) and the set of virtual optimum threshold values ($TH_{11}$ and $TH_{12}$) are collectively also referred to as virtual optimum parameters.

Further, the minimum value in the error $e(m, th_{11}, th_{12})$ of the t-th new weak classifier $f_t(X)$ is also referred to as a minimum error $e_{min}$.

Figure 14:
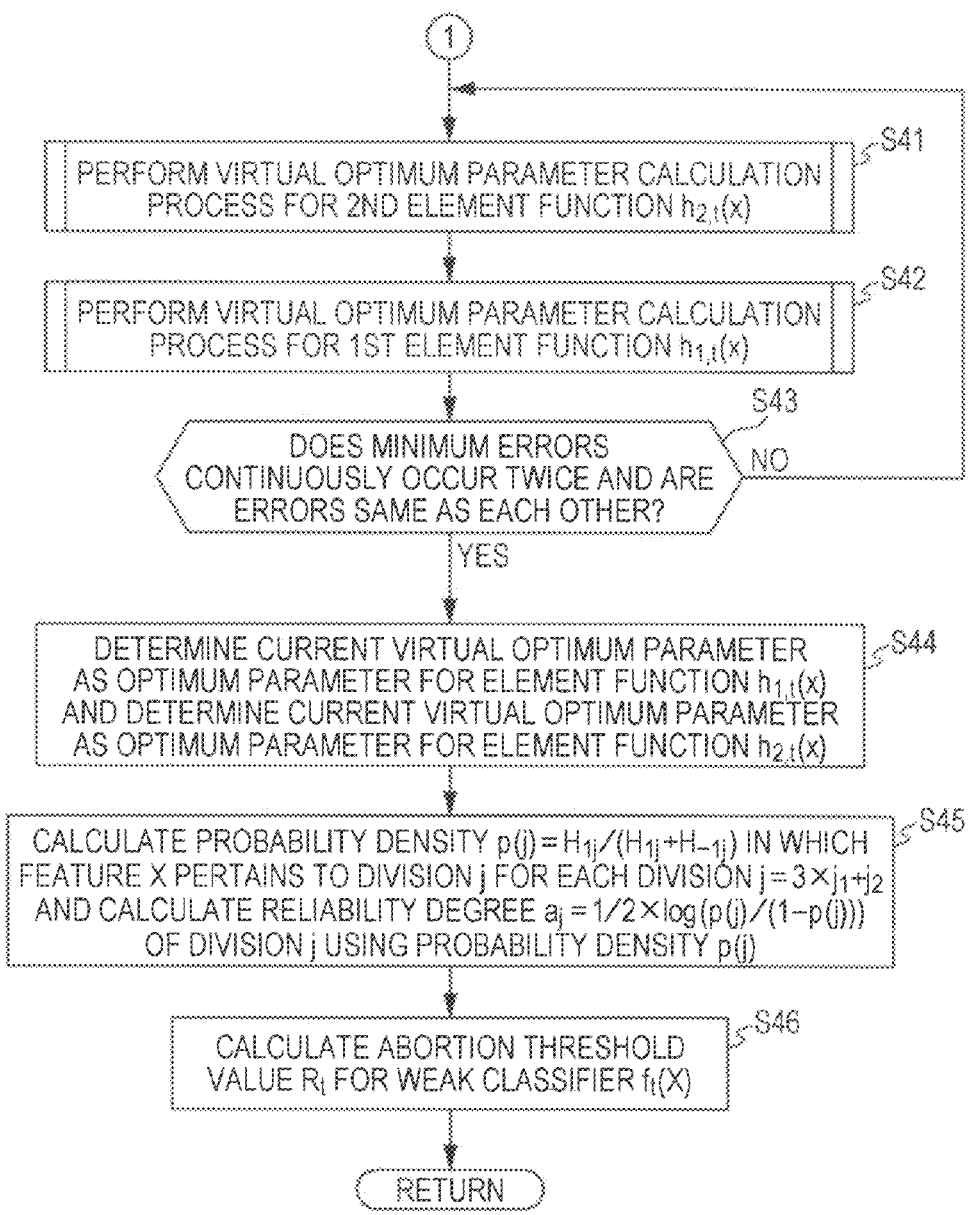
FIG. 14 is a flowchart of the weak classifier generation process.

When the learning unit 15 determines the pair of optimum pixel positions ($P_{11}$ and $P_{12}$) and the set of optimum threshold values ($TH_{11}$ and $TH_{12}$) as the virtual optimum parameters for the first element function $h_{1,t}(x)$, the learning unit 15 temporarily stores the minimum error $e_{min}$ in an internal memory (not shown), and then process proceeds to step S41 of FIG. 14.

FIG. 14 is a flowchart continuing from the flowchart in FIG. 13.

In step S41, the learning unit 15 performs a virtual optimum parameter calculation process for the second element function $h_{2,t}(x)$ to calculate the virtual optimum parameter of the second element function $h_{2,t}(x)$ between the two element functions $h_{1,t}(x)$ and $h_{2,t}(x)$ which the t-th new weak classifier $f_t(X)$ has, as in step S21 to step S35 of FIG. 13. Then, the process proceeds to step S42.

In step S42, the learning unit 15 performs a virtual optimum parameter calculation process for the first element function $h_{1,t}(x)$ to calculate (recalculate) the virtual optimum parameter of the first element function $h_{1,t}(x)$ between the two element functions $h_{1,t}(x)$ and $h_{2,t}(x)$ which the t-th new weak classifier $f_t(X)$ has, as in step S21 to step S35 of FIG. 13. Then, the process proceeds to step S43.

Here, in the virtual optimum parameter calculation process for the second element function $h_{2,t}(x)$ in step S41, the virtual optimum parameter of the second element function $h_{2,t}(x)$ is calculated as in step S21 to S35 of FIG. 13. At this time, the minimum error $e_{min}$ of the t-th new weak classifier $f_t(X)$ is calculated, as described with reference to FIG. 13.

Further, in the virtual optimum parameter calculation process for the first element function $h_{1,t}(x)$ in step S42, the virtual optimum parameter of the first element function $h_{1,t}(x)$ is calculated as in step S21 to S35 of FIG. 13. At this time, the minimum error $e_{min}$ of the t-th new weak classifier $f_t(X)$ is calculated, as described with reference to FIG. 13.

In step S43, the learning unit 15 determines whether the minimum error $e_{min}$ of the t-th new weak classifier $f_t(X)$ is the same value (value regarded as the same value) continuously twice.

When the learning unit 15 determines that the minimum error $e_{min}$ of the t-th new weak classifier $f_t(X)$ is not the same value continuously twice in step S43, that is, when it is necessary to correct the minimum error $e_{min}$, the process returns to step S41 and the same processes are reiterated below.

On the other hand, when the learning unit 15 determines that the minimum error $e_{min}$ is the same value continuously twice in step 43, that is, when it is not necessary to correct the minimum error $e_{min}$, the process proceeds to step S44. Then, the learning unit 15 confirms the optimum parameters of the first element function $h_{1,t}(x)$ and the second element function $h_{2,t}(x)$.

That is, the learning unit 15 confirms, as the optimum parameters, the pair of optimum pixel positions ($P_{11}$ and $P_{12}$) and the set of optimum threshold values ($TH_{11}$ and $TH_{12}$) of the current virtual optimum parameters for the first element function $h_{1,t}(x)$.

Further, the learning unit 15 confirms, as the optimum parameters, the pair of optimum pixel positions ($P_{21}$ and $P_{22}$) and the set of optimum threshold values ($TH_{21}$ and $TH_{22}$) of the current virtual optimum parameters for the second element function $h_{2,t}(x)$.

After the optimum parameters of the first element function $h_{1,t}(x)$ and the second element function $h_{2,t}(x)$ are confirmed in step S44, the process proceeds to step S45. Then, the learning unit 15 calculates the reliability degree $a_j$ of each whole division j for the t-th new weak classifier $f_t(X)$.

Here, according to the first element function $h_{1,t}(x)$, the first feature x between the two features $X=(x, x')$ is classified to one of the three sub-divisions (first division) $j_1$. Likewise, according to the second element function $h_{2,t}(x)$, the second feature x' between the two features $X=(x, x')$ is classified to one of the three sub-divisions $j_2$.

Further, according to the first element function $h_{1,t}(x)$ and the second element function $h_{2,t}(x)$, both the two features $X=(x, x')$ can be classified into the whole divisions j expressed with an expression $j=3 \times j_1 + j_2$ which is the sum of the sub-divisions $j_1$ and $j_2$.

The whole divisions j divided from both the two features $X=(x, x')$ are the divisions of nine combinations indicated by integers 0 to 8. The reliability degrees $a_j$ of the respective whole divisions j of the nine combinations are calculated in step S45.

That is, in step S45, the learning unit 15 calculates a probability density (probability distribution) p(j), at which both the two features $X=(x, x')$ of the positive image belong (are classified) to the whole divisions j, for the whole divisions j of the nine combinations by Expression (10).

$$p(j) = H_{+1j}/H_{+1j} + H_{-1j} \qquad (10)$$

In Expression (10), indicates a weighted histogram which can be calculated by Expression (8) described above by the use of the element function $h_{1,t}(x)$ of the pair of optimum pixel positions ($P_{11}$ and $P_{12}$) and the set of optimum threshold values ($TH_{11}$ and $TH_{12}$) as the confirmed optimum parameters and the element function $h_{2,t}(x)$ of the pair of optimum pixel positions ($P_{21}$ and $P_{22}$) and the set of optimum threshold values ($TH_{21}$ and $TH_{22}$) as the confirmed optimum parameters.

By Expression (10), a ratio of the learning image of the class k=+1, that is, the weighted histogram $H_{+1j}$ of the positive image, to weighted histograms (sum of the weighted histograms of the classes k=+1 and −1) $H_{+1j}+H_{-1j}$ of the learning image (two features X of the learning image) classified into the whole divisions j is calculated as the probability density p(j) at which the two features $X=(x, x')$ of the positive image is divided into the whole divisions j.

Further, by Expression (11), the learning unit 15 calculates a value corresponding to the probability density p(j) as the reliability degree $a_j$ of the whole divisions j based on the probability density p(j).

$$a_j = (1/2) \times \log(p(j)/(1-p(j))) \qquad (11)$$

By Expression (11), the probability density p(j) at which the two features $X=(x, x')$ of the positive image are classified into the whole divisions j becomes larger as the reliability degrees $a_j$ of the whole divisions j are larger.

When the learning unit 15 calculates the reliability degree $a_j$ of each whole division j for the t-th new weak classifier $f_t(X)$ in step S45, the reliability degree LUT to which the reliability degrees $a_j$ are assigned to the whole divisions j is generated as one of the parameters of the t-th new weak classifier $f_t(X)$. Then, the process proceeds to step S46.

In step S46, the learning unit 15 calculates the abortion threshold value $R_t$ as one of the parameters of the t-th new weak classifier $f_t(X)$. Then, the process is returned.

A method of calculating the abortion threshold value $R_t$ will be described below.

Figure 15:
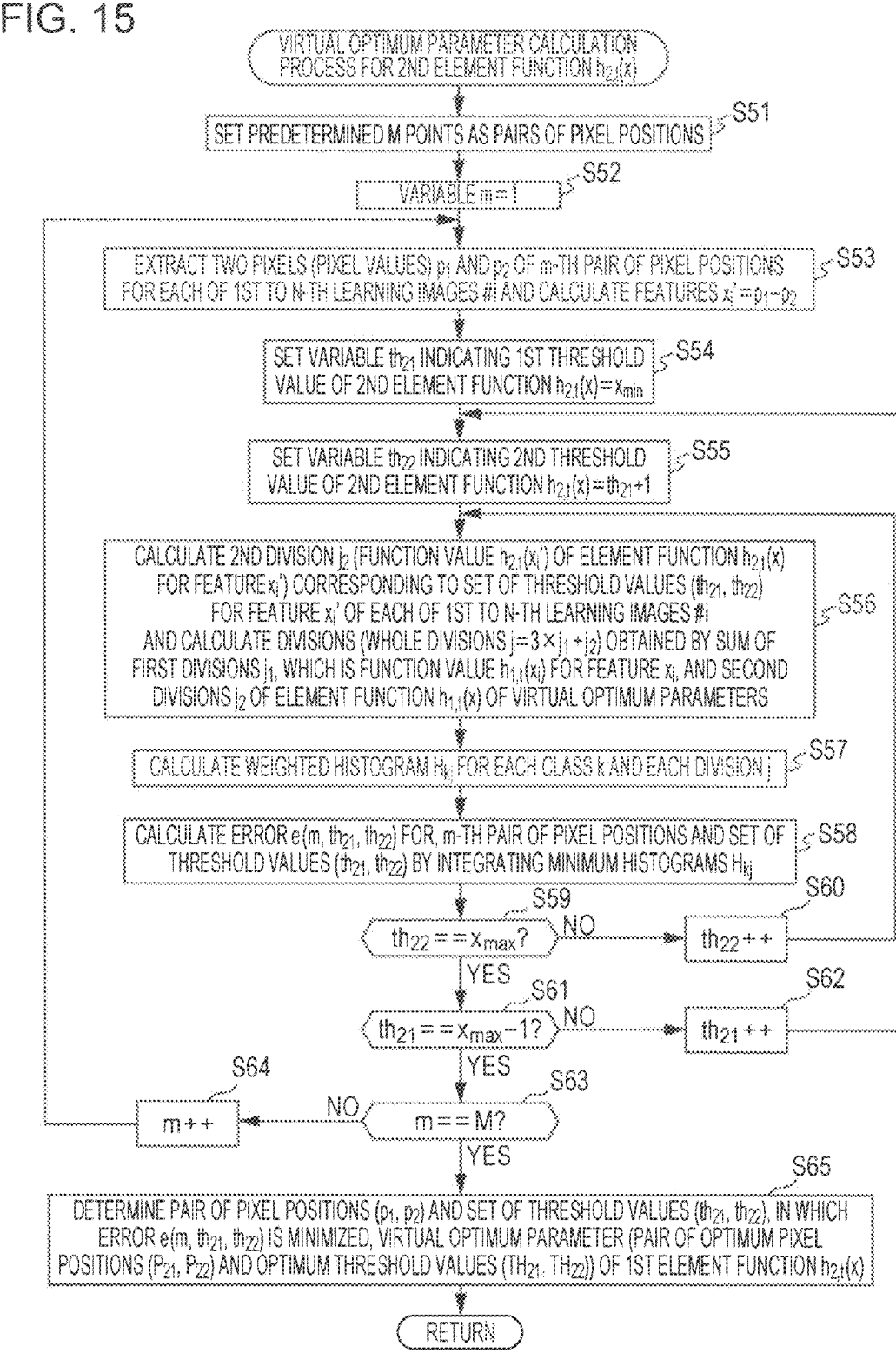
FIG. 15 is a flowchart of a virtual optimum parameter calculation process for a second element function $h_{2,t}(x)$.

FIG. 15 is a flowchart of a process of calculating a virtual optimum parameter for the second element function $h_{2,t}(x)$ in step S41 of FIG. 14.

In the virtual optimum parameter calculation process for the second element function $h_{2,t}(x)$, the same processes as those of step S21 to S35 of FIG. 13 are performed on the second element function $h_{2,t}(x)$ to calculate the pair of optimum pixel positions ($P_{21}$ and $P_{22}$) and the set of optimum threshold values ($TH_{21}$ and $TH_{22}$) as the virtual optimum parameters of the second element function $h_{2,t}(x)$ between the two element functions $h_{1,t}(x)$ and $h_{2,t}(x)$ which the t-th new weak classifier $f_t(X)$ has.

However, the pair of optimum pixel positions ($P_{21}$ and $P_{22}$) and the set of optimum threshold values ($TH_{21}$ and $TH_{22}$) as the virtual optimum parameters of the second element function $h_{2,t}(x)$ can be calculated by fixing the virtual optimum parameters already calculated at this time, that is, here, the pair of optimum pixel positions ($P_{11}$ and $P_{12}$) and the set of optimum threshold values ($TH_{11}$ and $TH_{12}$) as the virtual optimum parameters of the first element function $h_{1,t}(x)$.

That is, in step S51, the learning unit 15 sets the joints of a predetermined number M as the joints (pairs of pixel positions) of the positions of two pixels used to generate the inter-pixel difference features x as the features, as in step S21 of FIG. 13, and then the process proceeds step S52.

In step S52, the learning unit 15 initializes the variable m counting the pairs of pixel positions of the M combinations to 1, as in step S22 of FIG. 13, and then the process proceeds to step S53.

In step S53, the learning unit 15 extracts the pixel values $p_1$ and $p_2$ of two pixels at an m-th pair of pixel positions among the pairs of pixel positions of the M combinations in regard to the 1st to N-th learning images #1 to #N and calculates the feature $x_i' = p_1 - p_2$, which is the inter-pixel difference feature, as the second feature among the two features X provided with the t-th new weak classifier $f_t(X)$, as in step S23 of FIG. 13, and then the process proceeds to step S54.

In step S54, the learning unit 15 sets an initial value $x_{min}$ to a variable $th_{21}$ indicating a first threshold value, which is a smaller threshold value between two threshold values set in the second element function $h_{2,t}(x)$ of the two element functions $h_{1,t}(x)$ and $h_{2,t}(x)$ that the t-th new weak classifier $f_t(X)$ has, as in step S24 of FIG. 13, and then the process proceeds to step S55.

In step S55, the learning unit 15 sets an initial value $th_{21}+1$ to a variable $th_{22}$ indicating a second threshold value, which is a larger threshold value between the two threshold values set in the second element function $h_{2,t}(x)$ that the t-th new weak classifier $f_t(X)$ has, as in step S25 of FIG. 13, and then the process proceeds to step S56.

In step S56, the learning unit 15 calculates a sub-division $j_2$ of the feature $x_i'$, which is a second function value $h_{2,t}(x_i')$ output in regard to the feature $x_i$ by the second element function $h_{2,t}(x)$, in regard to the second feature $x_i'$ calculated from each learning image #i, as in step S26 of FIG. 13.

That is, the second element function $h_{2,t}(x)$ having the two threshold values $th_{21}$ and $th_{22}$ outputs one of three values 0, 1, and 2 in regard to the second feature $x_i'$ based on the magnitude relation between the feature $x_i'$ and the threshold values $th_{21}$ and $th_{22}$.

Specifically, the second element function $h_{2,t}(x)$ classifies the feature $x_i'$ to one of three sub-divisions, that is, the sub-division expressed as the expression $x_i' \leq th_{21}$, the sub-division expressed as the expression $th_{221} \leq x_i' \leq th_{22}$, and the sub-division expressed as the expression $th_{22} < x_i'$ by the use of the two threshold values $th_{21}$ and $th_{22}$.

Here, the sub-division expressed as the expression $x_i' \geq th_{21}$ can be assigned with 0, which is a value (integer value) indicating this sub-division, the sub-division expressed as the expression $th_{21} < x_i' \leq th_{22}$ can be assigned with 1, which is a value indicating this sub-division, and the sub-division expressed as the expression $th_{22} < x_i'$ is assigned with 2, which is value indicating this sub-division. The element function $h_{2,t}(x)$ outputs one of the three values 0, 1, and 2 as the sub-division (the value indicating the sub-division) of the feature $x_i'$.

Hereinafter, the sub-division $j_2$ of the second feature $x_i'$ output by the second element function $h_{2,t}(x)$ is also referred to as a second division.

When the process of step S56 is performed for the t-th new weak classifier $f_t(X)$, the pair of pixel positions ($P_{11}$ and $P_{12}$) and the set of threshold values ($TH_{12}$ and $TH_{12}$) are already calculated as the virtual optimum parameters of the first element function $h_{1,t}(x)$ between the two element functions $h_{1,t}(x)$ and $h_{2,t}(x)$ which the t-th new weak classifier $f_t(X)$ has.

Accordingly, in step S56, the learning unit 15 calculates the first division $j_1$ by fixing the pair of optimum pixel positions ($P_{11}$ and $P_{12}$) and the set of optimum threshold values ($TH_{11}$ and $TH_{12}$) as the virtual optimum parameters of the first element function $h_{1,t}(x)$.

That is, the learning unit 15 calculates the feature which is the inter-pixel difference feature, as the first feature amount between the two features X provided with the t-th new weak classifier $f_t(X)$ by the use of two pixel value $P_{11}$ and $P_{12}$ of the pair of optimum pixel positions ($P_{11}$ and $P_{12}$) as the virtual optimum parameter of the first element function $h_{1,t}(x)$ in regard to each learning image #i.

Further, the learning unit 15 calculates the first division $j_1$ of the first feature $x_i$ by providing the first feature $x_i$ to the first element function $h_{1,t}(x)$ having the threshold values $TH_{11}$ and $TH_{12}$.

In this way, when the learning unit 15 calculates the first division $j_1$ of the first feature $x_i$ obtainable from the first element function $h_{1,t}(x)$ and the second division $j_2$ of the second feature $x_i'$ obtainable from the second element function $h_{2,t}(x)$ in which the parameters are fixed to the virtual optimum parameters, the learning unit 15 calculates the divisions obtained through the sum of the first divisions $j_1$ and the second divisions $j_2$ as the whole divisions j classified from both the two features $X=(x_i, x_i')$ of the first feature $x_i$ and the second feature $x_i'$.

That is, the learning unit 15 calculates the whole divisions j by the expression $j=3 \times j_1 + j_2$, and then the process proceeds from step S56 to step S57.

In step S57, the learning unit 15 calculates a weighted histogram $H_{kj}$ for each class k and each whole division j by Expression (8) described above, as in step S27 of FIG. 13. Then, the process proceeds to step S58.

In step S58, the learning unit 15 calculates an error e(m, $th_{21}$, $th_{22}$) of the t-th new weak classifier $f_t(X)$ having the first element function $h_{1,t}(x)$ and the second element function $h_{2,t}(x)$ in regard to the m-th pair of pixel positions and the two threshold values $th_{21}$ and $th_{22}$ of the second element function $h_{2,t}(x)$ by the use of the weighted histogram $H_{kj}$ by Expressions (9) and (12) described above, as in step S28 of FIG. 13. Then, the process proceeds to step S59.

$$e(m, th_{21}, th_{22}) = \Sigma_j \min_k(H_{kj}) \quad (12)$$

In Expression (12), $\min_k(H_{kj})$ indicates the minimum weighted histogram $H_{kj}$ (here, $H_{-1j}$ or $H_{+1j}$) between the weighted histograms $H_{-1j}$ and $H_{+1j}$ which are the weighted histogram $H_{kj}$ of the whole divisions j, as in Expression (9).

In Expression (12), $\Sigma_j$ indicates the summation of the $\min_k$ ($H_{kj}$) taken by changing the variable j to 0, 1, 2, 3, 4, 5, 6, 7, and 8 which are values taken as the whole divisions j (here, $j=3 \times j_1 + j_2$).

By Expression (12), the error e(m, $th_{21}$, $th_{22}$) of the t-th new weak classifier $f_t(X)$ having the first element function $h_{1,t}(x)$ and the second element function $h_{2,t}(x)$ in regard to the m-th pair of pixel positions and the set of threshold values ($th_{21}$ and $th_{22}$) is calculated by integrating the minimum weighted histogram $H_{kj}$ between the weighted histograms $H_{kj}$ of the respective classes k=−1 and +1 of the learning image #i which is classified into the whole divisions j, that is, a smaller weighted histogram of the weighted histograms $H_{-1j}$ and $H_{+1j}$ for the whole divisions j=0, 1, . . . , and 8.

Here, the error e (m, $th_{21}$, $th_{22}$) of the t-th new weak classifier $f_t(X)$ having the first element function $h_{1,t}(x)$ and the second element function $h_{2,t}(x)$ indicates the extent that the weak hypothesis $f_t(X)$ output by the t-th new weak classifier $f_t(X=(x, x'))$ having the element functions $h_{1,t}(x)$ and $h_{2,t}(x)$ is erroneous when the second feature x' obtained for the m-th pair of pixel positions is provided with (input into) the element function $h_{2,t}(x')$ having the threshold values $th_{21}$ and $th_{22}$ and the first feature x obtained for the pair of virtual optimum pixel positions ($P_{11}$ and $P_{12}$) is provided to the element function $h_{1,t}(x)$ having the set of virtual optimum threshold value ($TH_{11}$ and $TH_{12}$).

In step S59, when the learning unit 15 determines whether the second threshold value $th_{22}$ of the second element function $h_{2,t}(x)$ is identical to the maximum value $x_{max}$, as in step S29 of FIG. 13. When the learning unit 15 determines that the threshold value $th_{22}$ is not identical to the maximum value $x_{max}$, the process proceeds to step S60. Then, the leaning unit 15 increases the threshold value $th_{22}$ by one.

The process returns from step S60 to step S56 to reiterate the same processes.

On the other hand, when the learning unit 15 determines that the threshold value $th_{22}$ is identical to the maximum value $x_{max}$ in step S59, the process proceeds to step S61. Then, the learning unit 15 determines whether the first threshold value $th_{21}$ of the second element function $h_{2,t}(x)$ is identical to the maximum value $x_{max}-1$, as in step S31 of FIG. 13.

When the learning unit 15 determines that the threshold value $th_{21}$ is not identical to the maximum value $x_{max}-1$ in step S61, the process proceeds to step S62. Then, the learning unit 15 increases the threshold value $th_{21}$ by one.

The process returns from step S62 to step S55 to reiterate the same processes.

On the other hand, when the learning unit 15 determines that the threshold value $th_{21}$ is identical to the maximum value $x_{max}-1$ in step S61, the process proceeds to step S63. Then, the learning unit 15 determines whether a variable m is identical to the predetermined number M, as in step S33 of FIG. 13.

When the learning unit 15 determines that the variable m is not identical to the predetermined number M in step S63, the process proceeds to step S64. Then, the learning unit 15 increases the variable m by one.

The process returns from step S64 to step S53 to reiterate the same processes.

On the other hand, when the learning unit 15 determines that the variable m is identical to the predetermined number M in step S63, that is, when the error $e(m, th_{21}, th_{22})$ of the t-th new weak classifier $f_t(X)$ is calculated for each of the pair of pixel positions of the M combinations and each of the set of threshold values ($th_{21}$ and $th_{22}$) of the ranges expressed as an expression $x_{min} \leq th_{21} \leq x_{max}-1$ and an expression $th_{21}+1 \leq th_{22} \leq x_{max}$, the process proceeds to step S65. Then, the learning unit 15 determines the pair of pixel positions ($P_{21}$ and $P_{22}$) and the set of threshold values ($TH_{21}$ and $Th_{22}$) for the second element function $h_{2,t}(x)$ as the virtual optimum parameters.

That is, in step S65, the learning unit 15 calculates the pair of pixel positions and the set of threshold values ($th_{21}$ and $th_{22}$) for which the minimum value (minimum errors $e_{min}$) is minimized among the errors $e(m, th_{21}, th_{22})$ of the t-th new weak classifier $f_t(X)$ calculated for the pair of pixel positions of the M combinations and the set of threshold values ($th_{21}$ and $th_{22}$) of the ranges expressed as the expression $x_{min} \leq th_{21} \leq x_{max}-1$ and the expression $th_{21}+1 \leq th_{22} \leq x_{max}$, and then determines the pair of pixel positions and the set of threshold values ($th_{21}$ and $th_{22}$) as a pair of virtual optimum pixel positions and a set of virtual optimum threshold values which are the virtual optimum parameters for the second element function $h_{2,t}(x)$.

Further, when the learning unit 15 determines the pair of optimum pixel positions ($P_{21}$ and $P_{22}$) and the set of virtual optimum threshold values ($TH_{21}$ and $TH_{22}$) as the virtual optimum parameters for the second element function $h_{2,t}(x)$ in step S65, the learning unit 15 temporarily stores the minimum error $e_{min}$ in the internal memory, and then process returns.

The minimum error $e_{min}$, stored in step S65 is used to determine whether the minimum error $e_{min}$ of the t-th new weak classifier $f_t(X)$ is the same value continuously twice in step S43 of FIG. 14 described above.

Figure 16:
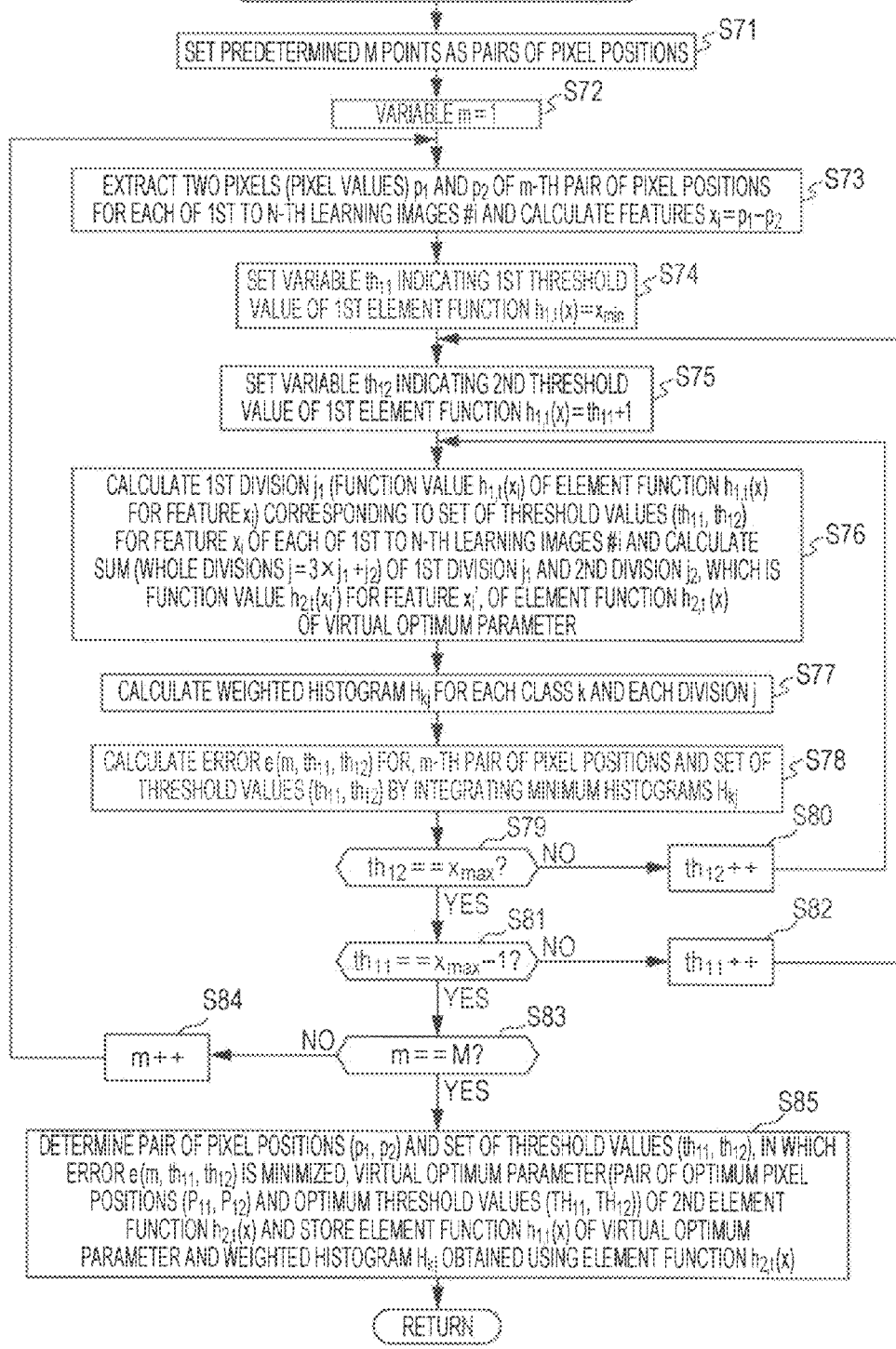
FIG. 16 is a flowchart of a virtual optimum parameter calculation process for a first element function $h_{1,t}(x)$.

FIG. 16 is a flowchart of a process of calculating a virtual optimum parameter for the first element function $h_{1,t}(x)$ in step S42 of FIG. 14.

In the virtual optimum parameter calculation process for the first element function $h_{1,t}(x)$, the processes of step S21 to step S35 of FIG. 13 are performed on the first element function $h_{1,t}(x)$ to again calculate the pair of optimum pixel positions ($P_{11}$ and $P_{12}$) and the set of virtual optimum threshold values ($TH_{11}$ and $TH_{12}$) as the virtual optimum parameters of the first element function $h_{1,t}(x)$ between the two element functions $h_{1,t}(x)$ and $h_{q,t}(x)$ which the t-th new weak classifier $f_t(X)$ has.

However, when the virtual optimum parameter calculation process for the first element function $h_{1,t}(x)$ is performed, the virtual optimum parameters are already calculated for all the element functions $h_{q,t}(x)$ forming the t-th new weak classifier $f_t(X)$. Therefore, in the virtual optimum parameter calculation process for the first element function $h_{1,t}(x)$, the pair of optimum pixel positions ($P_{11}$ and $P_{12}$) and the set of optimum threshold values ($TH_{11}$ and $TH_{12}$) as the virtual optimum parameters of the first element function $h_{1,t}(x)$ are again calculated by fixing the pair of optimum pixel positions ($P_{21}$ and $P_{22}$) and the set of optimum threshold values ($TH_{21}$ and $TH_{22}$) as the virtual optimum parameters of the element function other than first element function $h_{1,t}(x)$, that is, here, the second element function $h_{2,t}(x)$ already calculated at this time.

That is, in the virtual optimum parameter calculation process for the first element function $h_{1,t}(x)$, the same processes as those of step S21 to S35 of FIG. 13 are performed in step S71 to S85.

However, in the virtual optimum parameter calculation process for the first element function $h_{1,t}(x)$, the virtual optical parameters are already calculated for the second element function $h_{2,t}(x)$. Therefore, in step S76 corresponding to step S26 of FIG. 13 in which the whole divisions j are calculated, the learning unit 15 calculates the second division $j_2$ by fixing the pair of optimum pixel positions ($P_{21}$ and $P_{22}$) and the set of optimum threshold values ($TH_{21}$ and $TH_{22}$) as the virtual optimum parameters of the second element function $h_{2,t}(x)$.

That is, the learning unit 15 calculates the feature $x_i'=P_{11}-P_{12}$, which is the inter-pixel difference feature, as the second feature between the two features X provided with the t-th new weak classifier $f_t(X)$ by the use of the two pixel values $P_{21}$ and $P_{22}$ of the pair of optimum pixel positions ($P_{21}$ and $P_{22}$) as the virtual optimum parameters of the second element function $h_{2,t}(x)$ in regard to each learning image #i.

Further, the learning unit 15 calculates the second division $j_2$ of the second feature $x_i'$ by providing the second feature $x_i'$ to the second element function $h_{2,t}(x')$ having the two threshold values $TH_{21}$ and $TH_{22}$.

In step S76, the learning unit 15 calculates the first division $j_1$ which is the sub-division of the feature $x_i$ and the function value $h_{1,t}(x_i)$ output by the first element function $h_{1,t}(x)$, which has the two threshold values $th_{11}$ and $th_{12}$ in regard to the feature $x_i$, in regard to the first feature $x_i$ calculated from each learning image #i, that is, the feature $x_i$ calculated using the pixel values $p_1$ and $p_2$ at the m-th pair of pixel positions (in step S73), as in step S26 of FIG. 13.

When the learning unit 15 calculates the second divisions $j_2$ of the second features $x_i'$ obtained from the second element function $h_{2,t}(x)$ by fixing the parameters to the virtual optimum parameters and the first divisions $j_1$ of the first features $x_i$ obtained from the first element function $h_{1,t}(x)$ having the two threshold values $th_{11}$ and $th_{12}$ in regard to the features $x_i$ obtained using the m-th pair of pixel positions, the learning unit 15 calculates the sum divisions of the first divisions $j_1$ and the second divisions $j_2$ as the whole divisions j into which both the two features $X=(x_i, x_i')$ of the first feature $x_i$ and the second feature $x_i'$ are classified.

That is, the learning unit 15 calculates the whole divisions j by the expression $j=3 \times j_1 + j_2$.

When the whole divisions j are calculated in this way in step S76, the process proceeds from step S76 to step 77. The same processes as those of step S27 to S35 of FIG. 13 are also performed later in step S77 to S85.

That is, in step S77, the learning unit 15 calculates the weighted histogram $H_{kj}$ for each class k and each whole division j by Expression (8) described above. In step S78, the learning unit 15 calculates the error $e(m, th_{11}, th_{12})$ of the t-th new weak classifier $f_t(X)$ in regard to the m-th pair of pixel positions and the set of threshold values ($th_{11}$ and $th_{12}$) of the first element function $h_{1,t}(x)$ by the use of the weighted histogram by Expression (9) described above.

Further, when $\Sigma_j$ of Expression (9) is calculated in step S78, the summation of $\min_k(H_{kj})$ is calculated by changing the variable j with the values 0, 1, . . . , and 8 which are the values of the whole divisions j.

In step S85, the learning unit 15 calculates the pair of pixel positions and the set of threshold values ($th_{11}$ and $th_{12}$) of the minimum value (minimum error $e_{min}$) in the error $e(m, th_{11}, th_{12})$ of the t-th new weak classifier $f_t(X)$, which is calculated for the pair of pixel positions of the M combinations and the set of threshold values ($th_{11}$ and $th_{12}$) of ranges indicated by an expression of $x_{min} \leq th_{11} \leq x_{max}-1$ and an expression $th_{11}+1 \leq th_{12} \leq x_{max}$. The learning unit 15 determines (re-determines) the pair of pixel positions and the set of threshold values ($th_{11}$ and $th_{12}$) as the pair of virtual optimum pixel positions ($P_{11}$ and $P_{12}$) and the set of virtual optimum threshold values ($TH_{11}$ and $TH_{12}$) which are the virtual optimum parameters for the first element function $h_{1,t}(x)$.

In step S85, the learning unit 15 stores the minimum error $e_{min}$ in the internal memory, and then the process returns.

Further, in step S85, as well as the minimum error $e_{min}$, the weighted histogram obtained in step S77 by the use of the t-th new weak classifier $f_t(X)$, which has the element function $h_{1,t}(x)$ of the virtual optimum parameters for which the minimum error $e_{min}$ is obtained and the second element function $h_{2,t}(x)$ of the virtual optimum parameters already calculated, is also stored temporarily in the internal memory of the learning unit 15.

The minimum error $e_{min}$ stored in step S85 is used to determine whether the minimum error $e_{min}$ of the t-th new weak classifier $f_t(X)$ is the same value continuously twice in step S43 of FIG. 14 described above.

The weighted histogram stored in step S85 is used to calculate the probability density $p(j)$ in step S45 of FIG. 14 described above and to calculate the reliability degree $a_j$.

When the number of element functions $h_{q,t}(x)$ forming the new weak classifier $f_t(X)$ and the number of plurality of features X provided with the new weak classifier $f_t(X)$ are identical to each other and this number is set to Q, a q-th feature amount $x^{(q)}$ among the Q features can be provided with a q-th element function $h_{q,t}(x^{(q)})$ among the Q element functions forming the new weak classifier $f_t(X)$.

Accordingly, in the new ensemble learning described with reference to FIGS. 12 to 16, a process performed for the q-th element function $h_{q,t}(x)$ forming the new weak classifier $f_t(X)$ can be referred to as a process performed for the q-th feature $x^{(q)}$.

When the process performed for the q-th element function $h_{q,t}(x)$ is rephrased to the process performed for the q-th feature $x^{(q)}$, the pair of pixel positions and the threshold value used for calculating the minimum error of the new weak classifier $f_t(X)$ are sequentially calculated as the pair of pixel positions, which are the positions of two pixels used for calculating the feature $x^{(q)}$, and the threshold value for classifying the feature $x^{(q)}$ in regard to the plurality of Q features in the new ensemble process.

That is, in the embodiment of FIGS. 12 to 16, the pair of pixel positions and the threshold value for calculating the minimum error of the new weak classifier $f_t(X)$ are sequentially calculated for element functions $h_{1,t}(x^{(1)})$ and $h_{2,t}(x^{(2)})$ (step S21 to step S35 of FIG. 12 and step S41 of FIG. 14 initially performed).

At this time, the pair of pixel positions and the threshold value for calculating the minimum error of the new weak classifier $f_t(X)$ for the q-th feature can be calculated by fixing the pairs of pixel positions and the threshold values already calculated in regard to the first to the (q−1)-th features.

That is, in the embodiment of FIGS. 12 to 16, the pair of pixel positions and the threshold value for calculating the minimum error of the new weak classifier $f_t(X)$ for the second element function $h_{2,t}(x^{(2)})$ can be calculated by fixing the pair of pixel positions and the threshold value already calculated for the first to (2−1)-th element functions, that is, the first element function $h_{1,t}(x^{(1)})$ (step S41 of FIG. 14 initially performed).

In the new ensemble learning, the pairs of pixel positions and the threshold values for calculating the minimum error of the new weak classifier $f_t(X)$ are calculated in regard to all the Q features, and again, the pair of pixel positions and the threshold for calculating the minimum error of the new weak classifier $f_t(X)$ are repeatedly calculated in sequence for each of the Q features.

That is, in the embodiment of FIGS. 12 to 16, the pairs of pixel positions and the threshold values for calculating the minimum error of the new weak classifier $f_t(X)$ are calculated in regard to both the two element functions $h_{1,t}(x^{(1)})$ and $h_{2,t}(x^{(2)})$, and again, the pair of pixel positions and the threshold for calculating the minimum error of the new weak classifier $f_t(X)$ are repeatedly calculated in sequence for each of the element functions $h_{1,t}(x^{(1)})$ and $h_{2,t}(x^{(2)})$.

At this time, the pairs of pixel positions and the threshold values already calculated for the features other than the q-th feature among the Q features are fixed.

That is, in the embodiment of FIGS. 12 to 16, the pair of pixel positions and the threshold value for calculating the minimum error of the new weak classifier $f_t(X)$ for the second element function $h_{2,t}(x^{(2)})$ are calculated by fixing the pair of pixel positions and the threshold value already calculated for the first element function $h_{1,t}(x^{(1)})$, which is an element function other than the second element function $h_{2,t}(x^{(2)})$ (step S41 of FIG. 14).

Further, in the embodiment of FIGS. 12 to 16, the pair of pixel positions and the threshold value for calculating the minimum error of the new weak classifier $f_t(X)$ for the first element function $h_{1,t}(x^{(1)})$ are calculated by fixing the pair of pixel positions and the threshold value already calculated for the second element function $h_{2,t}(x^{(2)})$, which is an element function other than the first element function $h_{1,t}(x^{(1)})$ (step S42 of FIG. 14).

In the new ensemble learning, the process of sequentially calculating the pair of pixel positions and the threshold value for calculating the minimum error of the new weak classifier $f_t(X)$ in regard to each of the Q features is reiterated until the error of the new weak classifier $f_t(X)$ is not corrected.

That is, in the embodiment of FIGS. 12 to 16, the process of sequentially calculating the pair of pixel positions and the threshold value for calculating the minimum error of the new weak classifier $f_t(X)$ for the two element functions $h_{1,t}(x^{(1)})$ and $h_{2,t}(x^{(2)})$ is reiterated until the error of the new weak classifier $f_t(X)$ is not corrected (step S41 to step S43 of FIG. 14).

Abortion Threshold Value $R_t$

Figure 17:
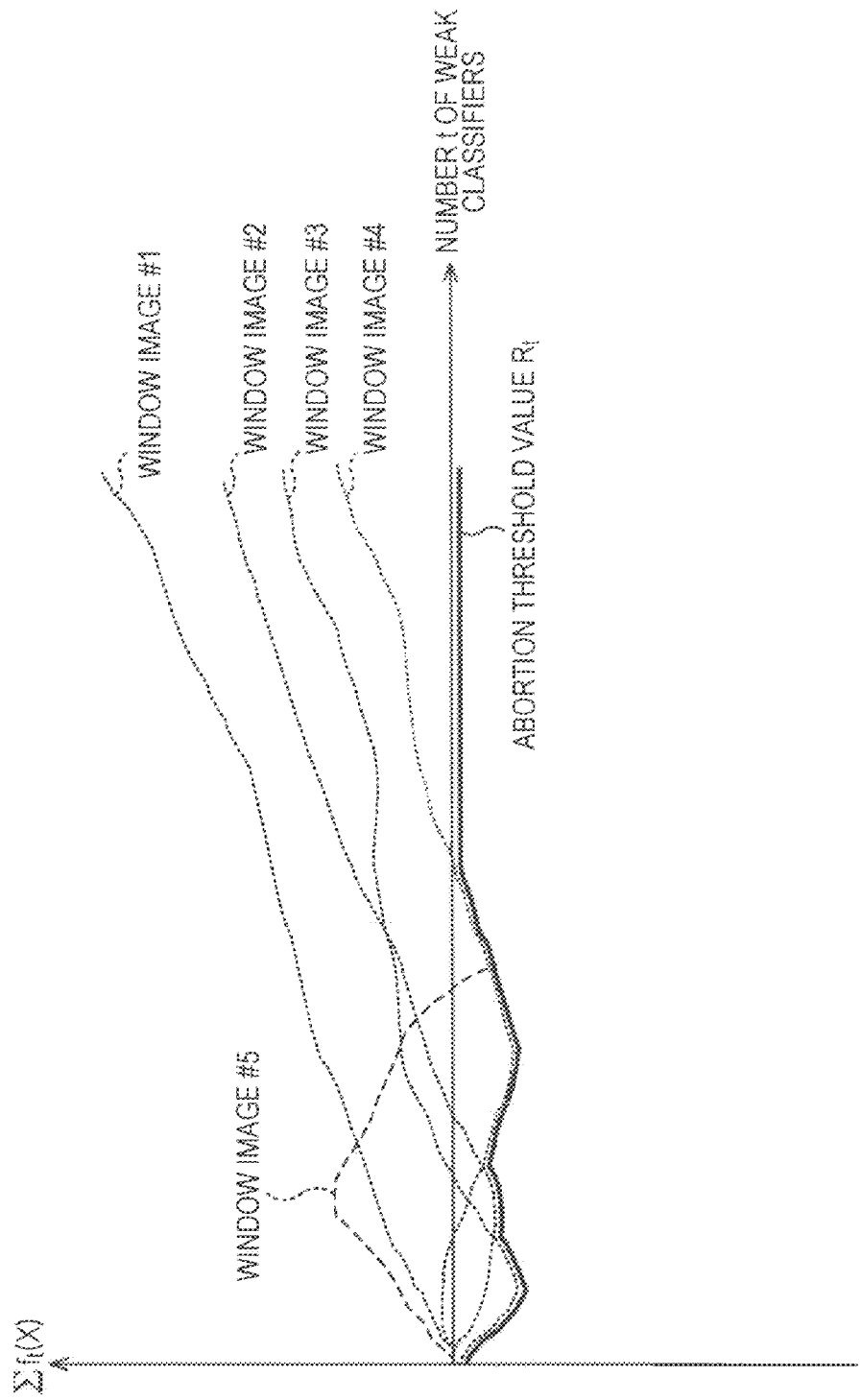
FIG. 17 is a diagram of a method of calculating an abortion threshold value $R_t$.

FIG. 17 is a diagram of a method of calculating the abortion threshold value $R_t$ in step S46 of FIG. 14.

An ensemble classifier H(X) calculated by the new ensemble learning is formed by T new weak classifiers $f_1(X)$, $f_2(X)$, . . . , and $f_T(X)$ and is stored in the classifier memory unit 14 (see FIG. 1).

The distinguishing unit 13 in FIG. 1 performs the window image distinguishing process of distinguishing whether a subject is shown in the window image supplied from the scanning unit 12 by the use of the ensemble classifier H(X) stored in the classifier storage unit 14.

That is, in the window image distinguishing process, the plurality of features (in this embodiment, two features) X extracted from the window image can be provided with the ensemble classifier H(X) and it is distinguished whether the subject is shown in the window image based on a classification value H(X) which is output from the ensemble classifier H(X) in regard to the two features X.

The classification value H(X) which is output from the ensemble classifier H(X) is a sign of the integrated value (weighting majority decision) of the weak hypotheses output $f_t(X)$ from the new weak classifiers $f_t(X)$ forming the ensemble classifier H(X) and is expressed by Expression (13).

$$H(X)=\text{sgn}\{\Sigma_t f_t(X)\} \quad (13)$$

In Expression (13), $\Sigma_t$ indicates the summation of the weak hypotheses $f_t(X)$ by changing the variable t from 1 to T. Further, sgn{ } indicates a sign of the brace bracket (where the sign of 0 is regarded as one of positive and negative signs (for example, a negative sign)).

When the classification value H(X) of Expression (13) is positive, it is distinguished that the subject is shown in the window image. When the classification value H(X) is negative, it is distinguished that no subject is shown in the window image.

In the window image distinguishing process, when the classification value H(X) of Expression (13) is calculated, the weak hypotheses $f_t(X)$ are calculated sequentially and integrated by sequentially changing the variable t from 1 to T.

That is, the classification value H(X) of Expression (13) is calculated by calculating the weak hypotheses $f_t(X)$ and repeatedly integrating the weak hypotheses $f_t(X)$ to the integrated value of the weak hypotheses $f_1(X)$ to $f_t(X)$ already calculated.

FIG. 17 shows an example of a variation of the integrated value (hereinafter, also referred to as an integrated value $\Sigma f_t(X)$ of t weak hypotheses) of t weak hypotheses $f_1(X)$ to $f_t(X)$ with respect to the variable t.

Further, FIG. 17 shows the integrated value $\Sigma f_t(X)$ of t weak hypotheses for each of five window images #1, #2, #3, #4, and #5.

Among the five window images #1 to #5, the window images #1 to #4 are positive images and the remaining window image #5 is a negative image.

In FIG. 17, the abortion threshold value $R_t$ is shown.

As for the window images #1 to #4 which are the positive images, the integrated value $\Sigma f_t(X)$ of t weak hypotheses are equal to or greater than the abortion threshold value $R_t$ regardless of a variable t (the number of weak hypotheses integrated).

On the other hand, as for the window image #5 which is the negative image, the integrated value $\Sigma f_t(X)$ of t weak hypotheses is less than the abortion threshold value $R_t$ when the integrated value $\Sigma f_t(X)$ of t weak hypotheses becomes the value of the variable t.

When the classification value H(X) of Expression (13) is calculated, the weak hypotheses $f_t(X)$ are sequentially calculated by changing the variable t from 1 to T and the integrated value $\Sigma f_t(X)$ of t weak hypotheses is calculated by integrating the weak hypotheses $f_t(X)$. However, the integrated value $\Sigma f_t(X)$ of t weak hypotheses becomes less than (or equal to or less than) the abortion threshold value $R_t$, the integration of the weak hypotheses $f_t(X)$ is aborted (stopped).

When the integration of the weak hypotheses $f_t(X)$ is aborted, it is distinguished that no subject is shown in the window image (the window image is the negative image).

The abortion threshold value $R_t$ compared to the integrated value $\Sigma f_t(X)$ of t weak hypotheses can be calculated using the positive images among N learning images by the learning unit 15.

That is, when it is assumed that there are K positive images among the N learning images and the plurality of features extracted from a k-th positive image #k among the K positive images is indicated by $X_k$, the learning unit 15 calculates the integrated values $\Sigma f_t(X_k)$ of t weak hypotheses in regard to the K positive images #k.

Then, the learning unit 15 calculates, as abortion threshold value $R_t$, the minimum value among the integrated values $\Sigma f_t(X_k)$ of t weak hypotheses in regard to the K positive images #k.

Specifically, the learning unit 15 calculates the abortion threshold value $R_t$ by Expression (14), for example.

$$R_t=\min\{\Sigma_i f_i(X_1), \Sigma_i f_i(X^r), \ldots, \Sigma_i f_i(X_1), 0\} \quad (14)$$

In Expression (14), $\Sigma_i$ indicates the summation of the weak hypotheses $f_i(X_k)$ by changing a variable i from 1 to t. Further, min{ } indicates the minimum value of the values in the brace bracket { }.

By Expression (14), the minimum value of the integrated values $\Sigma f_t(X_k)$ of t weak hypotheses=$f_1(X_k)+f_2(X_k)+\ldots+f_t(X_k)$ in regard to the K positive images #k is calculated as the abortion threshold value $R_t$.

However, when the minimum value of the integrated values $\Sigma f_t(X_k)$ of t weak hypotheses=$f_1(X_k)+f_2(X_k)+\ldots+f_t(X_h)$ in regard to the K positive images #k is greater than 0, the abortion threshold value $R_t$ is regarded as 0.

Accordingly, the abortion threshold value $R_t$ calculated by Expression (14) is restricted to a value equal to or less than 0.

The reason for restricting the abortion threshold value $R_t$ calculated by Expression (14) to the value equal to or less than 0 is that the abortion threshold value $R_t$ is made to be greater than 0 and the integration is prevented from stopping in a case where the integrated value $\Sigma f_t(X)$ of t weak hypotheses is greater than 0 since the distinguishing process of distinguishing whether the subject is shown by the use of the classifier calculated by Real AdaBoost or the ensemble classifier H(X) calculated by the new ensemble learning of using Real AdaBoost is performed based on the sign of the classification value H(X), for example, as described in Expression (13), that is, the distinguishing process is performed based on the magnitude relation between the integration values of the weak hypotheses $f_t(X)$ and the threshold value 0.

Further, the method (including whether the abortion threshold value $R_t$ is restricted other than the value of the abortion threshold value $R_t$) of restricting the abortion threshold value $R_t$ depends on the method (type) of the ensemble learning.

Learning Image

Figure 18:
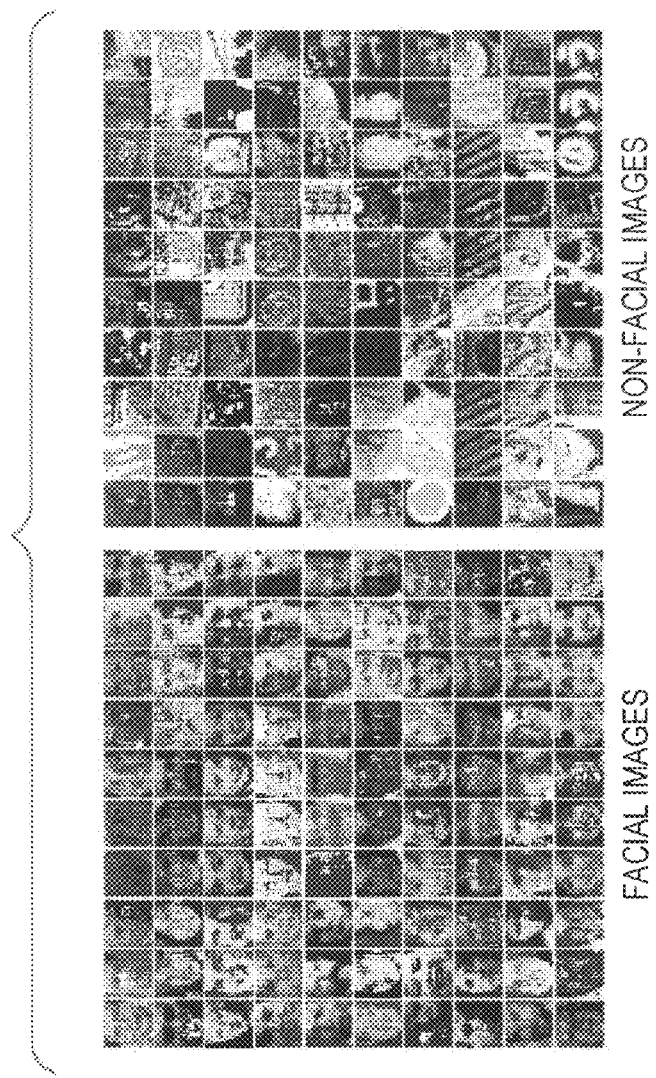
FIG. 18 is a diagram of examples of learning images used for the new ensemble learning.

FIG. 18 is a diagram of an example of a learning image used for the new ensemble learning.

The learning image is an image with the same size as that of the window image, for example, 20×20 pixels. The learning image includes the positive image and the negative image.

In FIG. 18, human faces are regarded as subjects. The positive image is a human face in which a human face is shown and the negative image is a non-human face in which a portion other than human face is shown.

Distinguishing Process

Figure 19:
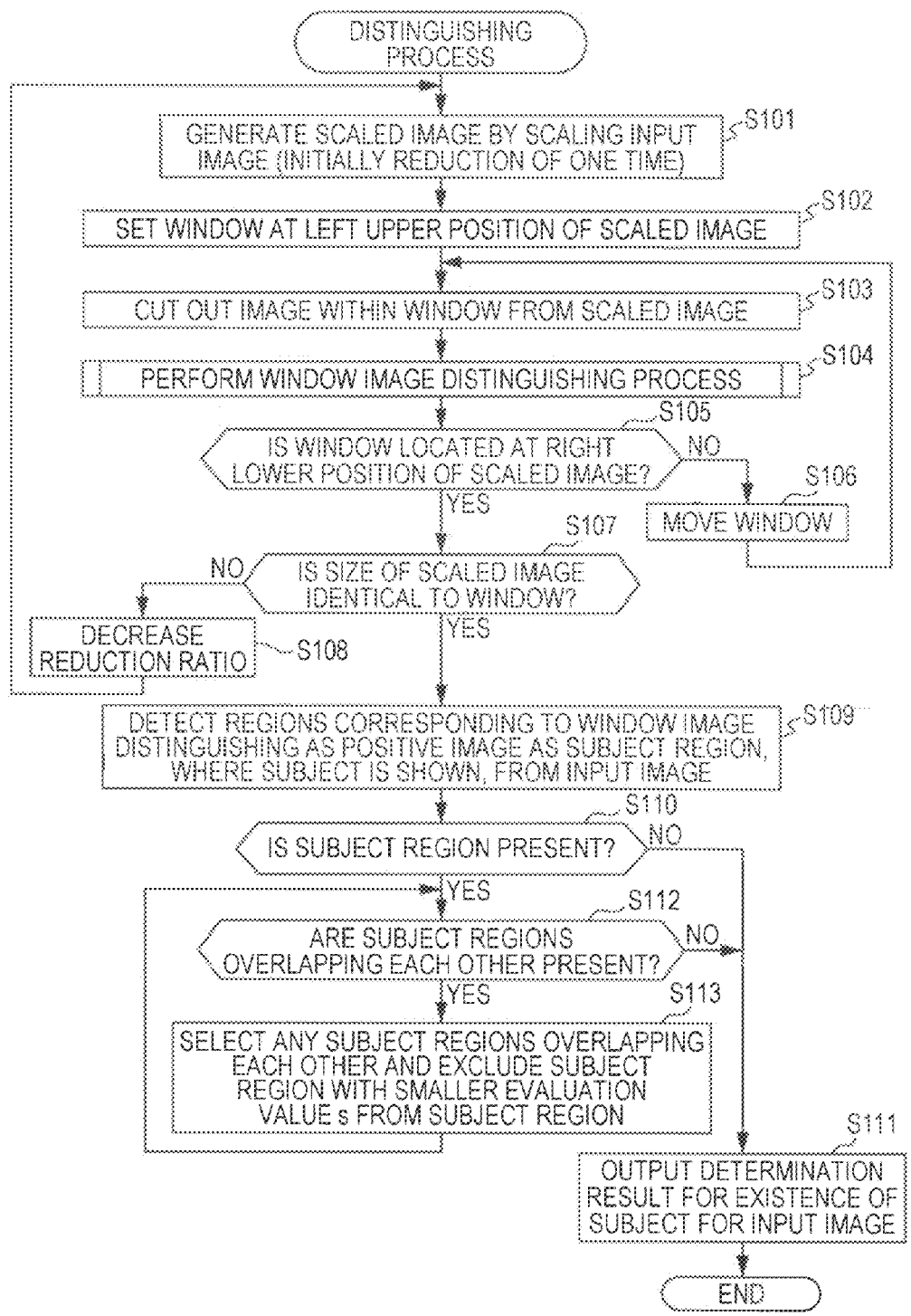
FIG. 19 is a flowchart of a distinguishing process.

FIG. 19 is a flowchart of a subject distinguishing process (distinguishing process) of distinguishing whether the subject is shown in the input image by the distinguishing apparatus shown in FIG. 1.

Here, in the distinguishing apparatus shown in FIG. 1, it is assumed that the ensemble classifier H(X) formed by T new weak classifier $f_t(X)$ by the new ensemble learning by the use of the learning image in which a human face is a subject, as shown in FIG. 18, is already stored in the classifier storage unit 14.

The scaling unit 11 waits for the input image to be supplied from the outside. In step S101, the scaling unit 11 reduces the input image from the outside and supplies the scanning unit 12 with the reduced image obtained through the reduction as a scaled image scaled from the input image. Then, the process proceeds to step S102.

When the scaling unit 11 is supplied with the input image from the outside, and then the process of step S101 is initially performed, the input image is reduced at a reduction ratio of one time. Accordingly, in this case, the input image with a non-reduced size is supplied as the scaled image from the scaling unit 11 to the scanning unit 12.

In step S102, the scanning unit 12 sets a window with a predetermined size of, for example, 20×20 pixels at the left upper position of the scaled image from the scaling unit 11. Then, the process proceeds to step S103.

In step S103, the scaling unit 12 cuts out an image within the window from the scaled image and supplies the distinguishing unit 13 with the cut image as the window image. Then, the process proceeds to step S104.

In step S104, the distinguishing unit 13 performs the window image distinguishing process of distinguishing whether the subject is shown in the window image from the scanning unit 12 by the use of the ensemble classifier stored in the classifier storage unit 14. Then, the process proceeds to step S105.

The window image distinguishing process performed by the distinguishing unit 13 will be described below. In the window image distinguishing process, the distinguishing unit 13 distinguishes whether the window image is the positive image in which a human image is shown or the negative image in which no human face is shown.

In step S105, the distinguishing unit 13 determines whether the window is located at the right lower portion of the scaled image.

When the distinguishing unit 13 determines that the window is not located at the right lower portion of the scaled image in step S105, the process proceeds to step S106. Then, the distinguishing unit 13 controls the scanning unit 12 such that the window is moved.

The scanning unit 12 moves the window on the scaled image to a subsequent position in the raster scan order under the control of the distinguishing unit 13. Then, the process returns from step S106 to step S103.

In step S103, the scanning unit 12 cuts out an image within the window moved from the scaled image and supplies the distinguishing unit 13 with the cut image as a window image. The same processes are reiterated later.

On the other hand, when the distinguishing unit 13 determines that the window is located at the right lower portion of the scaled image in step S105, the process proceeds to step S107. Then, the distinguishing unit 13 determines whether the size of the scaled image is identical to the size of the window.

When the distinguishing unit 13 determines that the size of the scaled image is not identical to the size of the window in step S107, that is, when the size of the scaled image is larger than the size of the window, the process proceeds to step S108. Then, the distinguishing unit 13 controls the scaling unit 11 such that the input image is reduced at a reduction ratio (a reduction ratio for further reducing the input image) smaller than the previous reduction ratio and the process returns to step S101.

In step S101, the scaling unit 11 reduces the input image under the control of the distinguishing unit 13 and supplies the scanning unit 12 with the obtained reduced image with a size smaller than the previous size as the scaled image. The same processes are reiterated later.

On the other hand, when the distinguishing unit 13 determines that the size of the scaled image is identical to the size of the window in step S107, that is, when the scaling unit 11 reduces the input image up to the same size as that of the window, the process proceeds to step S109. Then, the distinguishing unit 13 detects regions on the input image corresponding to the window images determined to be the positive images in the window image distinguishing process of step S104 performed up to this time as subject regions where the subject is shown, and then the process proceeds to step S110.

In step S110, the distinguishing unit 13 determines whether the subject region is present in the input image, that is, determines whether at least one subject region is detected from the input image in step S109.

When the distinguishing unit 13 determines that no subject region is present in the input image in step S110, that is, when the window image determined to be the positive image is not present in the window image obtained from the input image in the window image distinguishing process and thus no human face as the subject is shown in the input image, the process proceeds to step S111. Then, the distinguishing unit 13 outputs, for example, a message or the like, which indicates that the subject is not present, as determination result information indicating the determination result of the existence of the subject in the input image and ends the distinguishing process.

On the other hand, when the distinguishing unit 13 determines that the subject region is present in the input image in step S110, that is, when at least one subject region is present in the input image, the process proceeds to step S112. Then, the distinguishing unit 13 determines whether the subject regions overlapping each other are present in the subject regions present in the input image.

When the distinguishing unit 13 determines that the subject regions overlapping each other are present in the subject regions present in the input image in step S112, that is, when the plurality of subject regions is present in the input image and the subject regions overlapping each other are present in the plurality of subject regions, the process proceeds to step S113. The distinguishing unit 13 selects any two subject regions overlapping each other from the subject regions overlapping each other in the input image and excludes one of the two subject regions overlapping each other, that is, for example, the subject region with a smaller evaluation value s, which is described below and is calculated in the window image distinguishing process, from the subject regions.

Thereafter, the process returns from step S113 to step S112. The processes of step S112 and step S113 are reiterated until it is determined in step S112 that the subject regions overlapping each other are not present in the subject regions present in the input image.

When it is determined in step S112 that the subject regions overlapping each other are not present in the subject regions present in the input image, the process proceeds to step S111. The distinguishing unit 13 outputs, for example, a message indicating that the subject is present or an image input or the like displaying a frame surrounding the subject region, as determination result information indicating the determination result for the existence of the subject in regard to the input image, and then ends the distinguishing process.

Figure 20:
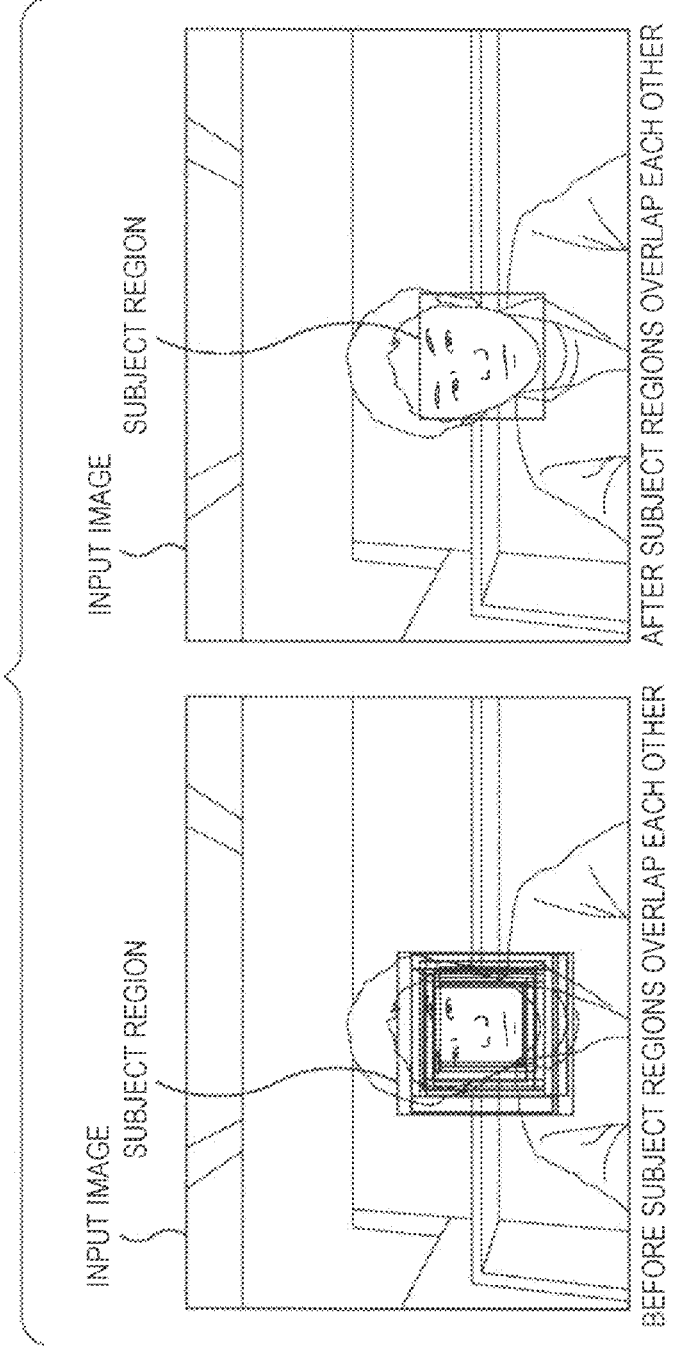
FIG. 20 is a diagram of a process of excluding one of two subject regions overlapping each other from the subject region.

FIG. 20 is a diagram of a process of excluding one of two subject regions overlapping each other from the subject regions in step S113 of FIG. 19.

In the distinguishing process, as described with reference to FIG. 19, the regions on the input image, which correspond to the window images determined to be the positive images, are detected as the subject regions in the window images in the windows moving on the scaled images obtained by reducing the input image while changing the reduction ratio. As shown in the left part of FIG. 20, even when only one person is shown in the input image, a plurality of regions including a region where the face of the person (the face as a subject) is detected as the subject regions, in some cases.

When the plurality of subject regions is detected, there is a high possibility that the face shown in the subject regions overlapping each other in the plurality of subject regions is the same face (person).

Accordingly, in the distinguishing process, the process of selecting any two subject regions overlapping each other from the subject regions overlapping each other and the process of excluding one of the two subject regions overlapping each other from the subject regions are reiterated until the subject regions overlapping each other disappear (step S112 and step S113 of FIG. 19). In this way, as shown in the right part of FIG. 20, only subject region remains for the face of one person.

Figure 21:
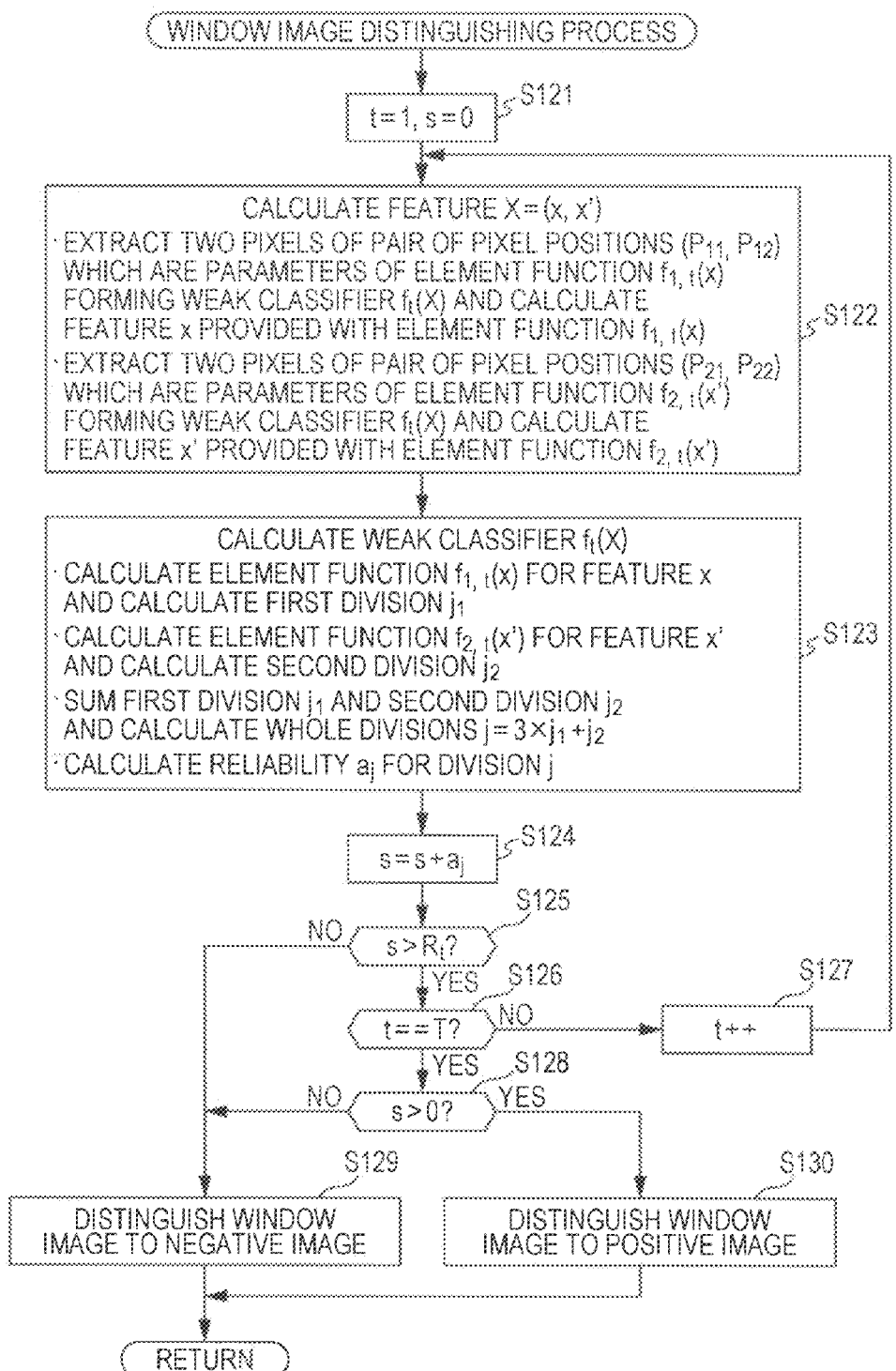
FIG. 21 is a flowchart of a window image distinguishing process.

FIG. 21 is a flowchart of the window image distinguishing process performed in step S104 of FIG. 19.

In step S121, the distinguishing unit 13 initializes, to 1, the variable t counting the T new weak classifier $f_1(X)$, $f_2(X), \ldots, f_T(X)$ forming the ensemble classifier H(X) stored in the classifier storage unit 14.

Further, in step S121, the distinguishing unit 13 initializes, to 0, the evaluation value s for evaluating the window image to distinguish whether the subject is shown in the window image from the scanning unit 12. Then, the process proceeds to step S122.

In step S122, the distinguishing unit 13 extracts two features X=(x, x') as a plurality of features provided with the t-th new weak classifier $f_t(X)$ from the window image from the scanning unit 12.

That is, the distinguishing unit 13 extracts the two pixel values $P_{11}$ and $P_{12}$ of the pair of pixel positions ($P_{11}$ and $P_{12}$), which are the parameters of t-th new weak classifier $f_t(X)$ (the first element function $h_{1,t}(x)$) from the window image and calculates the inter-pixel difference feature $x=P_{11}-P_{12}$ which is a feature provided with the first element function $h_{1,t}(x)$ of the t-th new weak classifier $f_t(X)$.

Further, the distinguishing unit 13 extracts the two pixel values $P_{21}$ and $P_{22}$ of the pair of pixel positions ($P_{21}$ and $P_{22}$), which are the parameters of the t-th new weak classifier $f_t(X)$ (the second element function $h_{2,t}(x)$) from the window image and calculates the inter-pixel difference feature $x'=P_{21}-P_{22}$ which is a feature provided with the second element function $h_{2,t}(x)$ of the t-th new weak classifier $f_t(X)$.

Thereafter, the process proceeds from step S122 to step S123. Then, the distinguishing unit 13 calculates the weak hypothesis $f_t(X)$ by providing the t-th new weak classifier $f_t(X)$ with the two features X=(x, x') calculated immediately previously in step S122 and calculating the new weak classifier $f_t(X)$.

That is, the distinguishing unit 13 calculates the first divisions $j_1$ of the first feature x by providing the first feature x between the two features X=(x, x') to the first element function $h_{1,t}(x)$ having the two threshold values $TH_{11}$ and $TH_{12}$.

Further, the distinguishing unit 13 calculates the second divisions $j_2$ of the second feature x' by providing the second feature x' between the two features X=(x, x') to the second element function $h_{2,t}(x')$ having the two threshold values $TH_{21}$ and $TH_{22}$.

When the distinguishing unit 13 calculates the first divisions $j_1$ of the first feature $x_i$ and the second divisions $j_2$ of the second feature $x_i'$, the distinguishing unit 13 calculates the sum divisions of the first divisions $j_1$ and the second divisions $j_2$ as the whole divisions j into which the two features X=($x_i$, $x_i'$) of the first feature $x_i$ and the second feature $x_i'$.

That is, the distinguishing unit 13 calculates the whole divisions j of the two features X=($x_i$, $x_i'$) by the expression $j=3\times j+_1+j_2$, as the learning unit 15 calculates the whole divisions j by the new ensemble learning.

The distinguishing unit 13 calculates the reliability degree $a_j$ configured to be assigned to the whole divisions j of the two features X=($x_i$, $x_i'$) in the reliability degree LUT, which is the parameter of the t-th new weak classifier $f_t(X)$, as the weak hypothesis $f_t(X)$ which is output from the t-th new weak classifier $f_t(X)$.

When the reliability degree $a_j$ is calculated as the weak hypothesis $f_t(X)$, the process proceeds from step S123 to step S124. Then, the distinguishing unit 13 updates the evaluation value s by adding the reliability degree $a_j$ as the weak hypothesis $f_t(X)$ to the evaluation value s. Then, the process proceeds to step S125.

Here, the updated evaluation value s obtained in step S124 is the integrated value $\Sigma f_t(X)$ of the t weak hypotheses described with reference to FIG. 17. Further, the updating of the evaluation value s in step S124 is the integration of the weak hypotheses $f_t(X)$ performed to calculate the classification value H(X) which is output from the ensemble classifier H(X) by Expression (13).

In step S125, the distinguishing unit 13 determines whether the evaluation value s is greater than the abortion threshold value $R_t$ which is the parameter of the t-th new weak classifier $f_t(X)$.

When the distinguishing unit 13 determines that the evaluation value s is greater than the abortion threshold value $R_t$ in step S125, the process proceeds to step S126. Then, the distinguishing unit 13 determines whether the variable t is identical to the number T of new weak classifiers $f_t(X)$ forming the ensemble classifier H(X).

When the distinguishing unit 13 determines that the variable t is not identical to the number T of new weak classifiers $f_t(X)$ forming the ensemble classifier H(X) in step S126, the process proceeds to step S127. Then, distinguishing unit 13 increases the variable t by one.

The process returns from step S127 to step S122 and the same processes are reiterated later.

When the distinguishing unit 13 determines that the variable t is identical to the number T of new weak classifiers $f_t(X)$ forming the ensemble classifier H(X) in step S126, that is, the integration as the summation of the right side of Expression (13) performed to calculate the classification value H(X) is performed on all the weak hypotheses $f_t(X)$ of the T new weak classifiers $f_t(X)$ forming the ensemble classifier H(X), the process proceeds to step S128. Then, the distinguishing unit 13 determines whether the evaluation value s is greater than the threshold value 0.

When the distinguishing unit 13 determines that the evaluation value s is not greater than the threshold value 0 in step S128, that is, the classification value H(X), which is the sign of the integrated value $\Sigma_t f_t(X)$ (the right side $\Sigma_t f_t(X)$ of Expression (13)) of all the weak hypotheses $f_t(X)$ of the T new weak classifiers $f_t(X)$ forming the ensemble classifier H(X), is not the positive value, the process proceeds to step S129. Then, the distinguishing unit 13 determines that the window image is the negative image and the process returns.

On the other hand, when the distinguishing unit 13 determines that the evaluation value s is not greater than the abortion threshold value $R_t$ in step S125, the process proceeds to step S129. Then, the distinguishing unit 13 determines that the window image is the negative image and the process returns.

Accordingly, when the evaluation value s, that is, the integrated value $\Sigma f_t(X)$ of the t weak hypotheses is not greater than the abortion threshold value $R_t$, the updating of the evaluation value s in step S124, that is, the integration of the weak hypotheses $f_t(X)$ performed to calculate the classification value H(X) which is output from the ensemble classifier H(X) of Expression (13) is aborted.

When the integrated value $\Sigma f_t(X)$ of the t weak hypotheses is not greater than the abortion threshold value $R_t$, there is a very low possibility that the window image is the positive image. Therefore, when the integrated value $\Sigma_t f_t(X)$ of the t weak hypotheses is not greater than the abortion threshold value $R_t$, the entire distinguishing process (see FIG. 19) can be made to be performed at high speed (for a short time) by aborting the integration of the weak hypotheses $f_t(X)$.

On the other hand, the distinguishing unit 13 determines that the evaluation value s is greater than the threshold value 0 in step S128, that is, the classification value H(X), which is the sign of the integrated value $\Sigma_t f_t(X)$ (the right side $\Sigma_t f_t(X)$ of Expression (13)) of all the weak hypotheses $f_t(X)$ of the T new weak classifiers $f_t(X)$ forming the ensemble classifier H(X), is the positive value, the process proceeds to step S130. Then, the distinguishing unit 13 determines that the window image is the positive image and the process returns.

Computer to which Embodiment of the Disclosure is Applied

Next, the above-described series of processes may be executed by hardware or software. When the series of processes are performed by software, a program for the software is installed in a general computer or the like.

Figure 22:
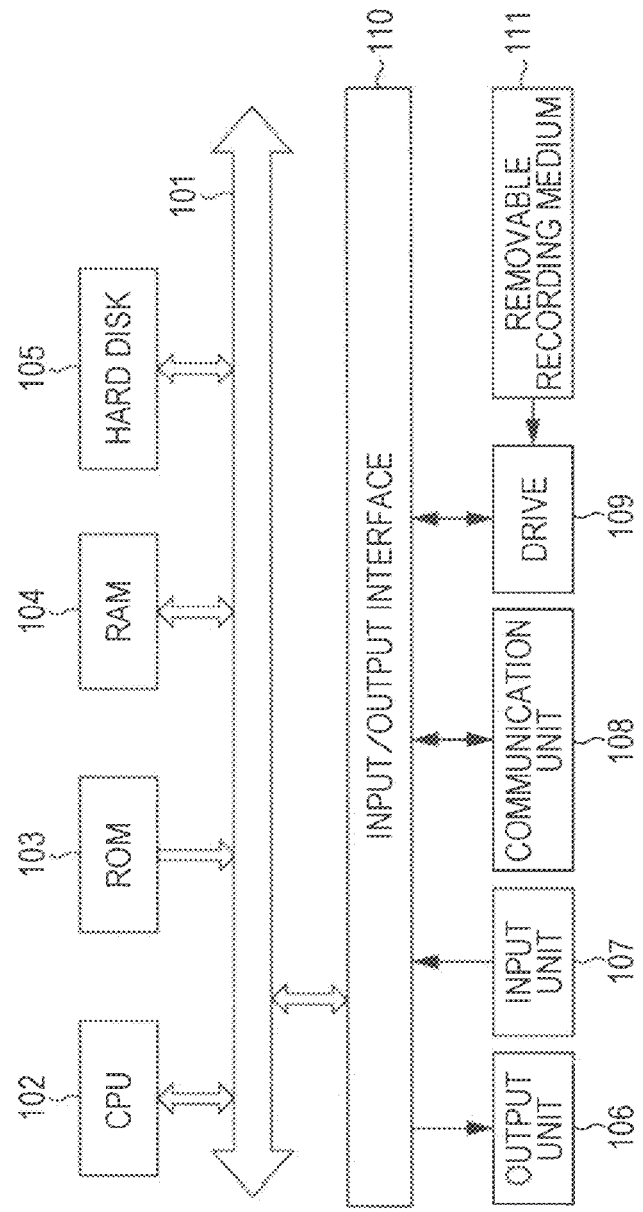
FIG. 22 is a block diagram of an example of the configuration of a computer according to an embodiment of the disclosure.

FIG. 22 is a diagram of an example of the configuration of a computer to which the program executing the above-described series of processes is installed according to an embodiment of the disclosure.

The program can be stored in advance in a hard disk 105 or a ROM 103 serving as a recording medium built in the computer.

Alternatively, the program may be stored (recorded) in a removable recording medium 111. The removable recording medium 111 can be provided as a so-called package software. Here, examples of the removable recording medium 111 include a flexible disc, a CD-ROM (Compact Disc-Read Only Memory), an MO (MagnetoOptical) disc, a DVD (Digital Versatile Disc), a magnetic disc, and a semiconductor memory.

Further, not only the program can be installed in the computer from the above-described removable recording medium 111, but also the program can be downloaded to the computer via a communication network or a broadcasting network and can be installed in the internal hard disk 105. That is, for example, the program can be transmitted wirelessly from a download site to the computer via a satellite for digital satellite broadcasting or can be transmitted to the computer in the wired manner via a network such as a LAN (Local Area Network) or the Internet.

The computer has a CPU (Central Processing Unit) 102 therein. The CPU 102 is connected to an input/output interface 110 via a bus 101.

When a user gives an instruction by operating an input unit 107 via input/output interface 110, the CPU 102 executes the program stored in the ROM (Read Only Memory) 103 in accordance with the instruction. Alternatively, the CPU 102 loads the program stored in the hard disk 105 in the RAM (Random Access Memory) 104 and executes the program.

In this way, the CPU 102 executes the processes described above with reference to the flowcharts or the processes performed by the configuration described above with reference to the block diagram. For example, the CPU 102 outputs the processed results from an output unit 106, transmits the processed results from the communication unit 108, and records the processed results in the hard disk 105 via the input/output interface 110, if necessary.

The input unit 107 includes a keyboard, a mouse, and a microphone. The output unit 106 includes an LCD (Liquid Crystal Display) or a speaker.

Here, in the specification, the processes executed in accordance with the program by the computer may not necessarily be executed chronologically in the orders described in the flowcharts. That is, the processes executed in accordance with the program by the computer include the processes executed in parallel or the processed executed individually (for example, parallel processes or processes by objects).

The program may be executed by a single computer (processor) or may be distributed for processing by a plurality of computers. Further, the program may be transmitted to and executed in a computer located away.

Embodiments of the disclosure is not limited to the above-described embodiments of the disclosure, but may be modified in various forms within the scope of the disclosure without departing from the gist of the disclosure.

That is, in this embodiment, the number of features input to the new weak classifier $f_t(X)$ and the number of element functions $h_{q,t}(x)$ which new weak classifier $f_t(X)$ has are set to two. However, the number of features and the number of element functions $h_{q,t}(x)$ are not limited two, but may be set to three or more.

In this embodiment, two threshold values are set in the element function $h_{q,t}(x)$ and the feature input to the element function $h_{q,t}(x)$ is classified to one of the three sub-divisions by the element function $h_{q,t}(x)$. However, J threshold values, that is, three or more threshold values may be set in the element function $h_{q,t}(x)$ and the feature input to the element function $h_{q,t}(x)$ may be classified to one of J+1 sub-divisions by the element function $h_{q,t}(x)$.

In this embodiment, the inter-pixel difference feature is used as the feature input to the new weak classifier $f_t(X)$. However, any feature other than the inter-pixel difference feature may be used as the feature.

When the inter-pixel difference feature is used as the feature input to the new weak classifier $f_t(X)$, two pixel positions (pair of pixel positions) used to calculate the inter-pixel feature input to the new weak classifier $f_t(X)$ are necessary to distinguish the subject with high performance. For this reason, in the new ensemble learning (see FIGS. 12 to 16), two pixel positions are calculated to make the error of the new weak classifier $f_t(X)$ minimum. However, when the feature which does not depend on the pixel positions is used as the feature input to the new weak classifier $f_t(X)$, the loop for the variable m counting the pair of pixel positions is not necessary in the new ensemble learning.

The present disclosure contains subject matter related to that disclosed in Japanese Priority Patent Application JP 2010-263804 filed in the Japan Patent Office on Nov. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a distinguishing unit which, by using an ensemble classifier, which includes a plurality of weak classifiers outputting weak hypotheses which indicates whether a predetermined subject is shown in an image in response to inputs of a first plurality of features extracted from the image, and a second plurality of features extracted from an input image, sequentially integrates the weak hypotheses output by the weak classifiers in regard to the first and second plurality of features and distinguishes whether the predetermined subject is shown in the input image based on the integrated value of the weak hypotheses,
wherein each weak classifier classifies each of the first and second plurality of features to one of three or more sub-divisions based on threshold values, calculates sum divisions of the sub-divisions of the first and second plurality of features as whole divisions into which the first and second plurality of features is classified, and outputs, as one of the weak hypotheses, a reliability degree of the whole divisions assignable to the whole divisions of the first and second plurality of features,
wherein the ensemble classifier is calculated by ensemble learning, and
wherein in the ensemble learning, the reliability degree of the whole divisions is assignable to the respective whole divisions of each weak classifier.

2. The information processing apparatus according to claim 1, wherein in the ensemble learning,
threshold values, through which an error in each weak classifier is minimized, as the threshold values used for classifying the features are sequentially calculated in regard to a plurality of respective Q features, and
the threshold value through which the error in each weak classifier is minimized in regard to a q-th feature among the Q features is able to be obtained by fixing the threshold values already calculated in regard to first to (q−1)-th features.

3. The information processing apparatus according to claim 2, wherein in the ensemble learning,
calculating the threshold values, through which the error in each weak classifier is minimized, in regard to all the Q features, and then sequentially calculating the threshold values, through which the error in each weak classifier is minimized, in regard to the respective Q features, are reiterated, and
when the threshold value through which the error in each weak classifier is minimized in regard to the q-th feature among the Q features is calculated again, the threshold values already calculated in regard to the features other than the q-th feature among the Q features are fixed.

4. The information processing apparatus according to claim 3, wherein in the ensemble learning,
sequentially calculating the threshold values, through which the error in each weak classifier is minimized, in regard to the respective Q features, is reiterated until the error of each weak classifier is not corrected.

5. The information processing apparatus according to claim 1, wherein the feature is a difference between pixels at two positions of the input image.

6. The information processing apparatus according to claim 5, wherein in the ensemble learning,
pairs of pixel positions, which are the two positions of the pixels used to calculate the feature, and threshold values, through which an error in each weak classifier is minimized, as the threshold values used for classifying the features are sequentially calculated in regard to a plurality of respective Q features, and
the pair of pixel positions and the threshold value through which the error in each weak classifier is minimized in regard to a q-th feature among the Q features are able to be obtained by fixing the pairs of pixel positions and the threshold values already calculated in regard to first to (q−1)-th features.

7. The information processing apparatus according to claim 6, wherein in the ensemble learning,
calculating the pairs of pixel positions and the threshold values, through which the error in each weak classifier is minimized, in regard to all the Q features, and then sequentially calculating the pairs of pixel positions and the threshold values, through which the error in each weak classifier is minimized, in regard to the respective Q features, are reiterated, and
when the pair of pixel positions and the threshold value through which the error in each weak classifier is minimized in regard to the q-th feature among the Q features are calculated again, the pairs of pixel positions and the threshold values already calculated in regard to the features other than the q-th feature among the Q features are fixed.

8. The information processing apparatus according to claim 7, wherein in the ensemble learning,
sequentially calculating the pairs of pixel positions and the threshold values, through which the error in each weak classifier is minimized, in regard to the respective Q features, is reiterated until the error in each weak classifier is not corrected.

9. The information processing apparatus according to claim 8,
wherein the ensemble learning is performed using a plurality of learning images,
wherein the plurality of learning images includes a positive image in which the subject is shown and a negative image in which no subject is shown, and
wherein in the ensemble learning,
when it is assumed that $D_t(i)$ indicates a weight of an i-th learning image among the plurality of learning images with respect to a t-th weak classifier, for each class indicating that the learning image is one of the positive image and the negative image and each whole division, an integrated value of the weights $D_t(i)$ of the learning image of the class K, which is divided into the whole divisions j, among the weights $D_t(i)$ is calculated as a weighted histogram $H_{kj}$ of the learning image of the class k, which is divided into the whole divisions j,
the error of the t-th weak classifier is calculated by integrating minimum weighted histograms $H_{kj}$ for the whole divisions among the weighted histograms $K_{kj}$ of the respective classes of the learning image which is divided into the whole divisions j,
in the t-th weak classifier, a probability density p(j) at which the positive image is divided into the whole divisions j is calculated using the weighted histogram $H_{kj}$ of each class k into the entity divisions j and a value corresponding to the probability density p(j) is calculated as a reliability degree $a_j$ of the whole divisions j based on the probability density p(j), and the weight $D_t(i)$ is updated by boosting.

10. An information processing method comprising: by using an ensemble classifier, which includes a plurality of weak classifiers outputting weak hypotheses which indicates whether a predetermined subject is shown in an image, in response to inputs of a first plurality of features extracted from the image, and a second plurality of features extracted from an input image, sequentially integrating the weak hypotheses output by the weak classifiers in regard to the first and second plurality of features and distinguishing whether the predetermined subject is shown in the input image based on the integrated value of the weak hypotheses by an information processing apparatus, wherein each weak classifier classifies each of the first and second plurality of features to one of three or more sub-divisions based on threshold values, calculates sum divisions of the sub-divisions of the first and second plurality of features as whole divisions into which the first and second plurality of features is classified, and outputs, as one of the weak hypotheses, a reliability degree of the whole divisions assignable to the whole divisions of the first and second plurality of features, wherein the ensemble classifier is calculated by ensemble learning, and wherein in the ensemble learning, the reliability degree of the whole divisions is assignable to the respective whole divisions of each weak classifier.

11. A non-transitory computer-readable medium including a program, which when executed by a computer, causes the computer to function as:

a distinguishing unit which, by using an ensemble classifier, which includes a plurality of weak classifiers outputting weak hypotheses which indicates whether a predetermined subject is shown in an image, in response to inputs of a first plurality of features extracted from the image, and a second plurality of features extracted from an input image, sequentially integrates the weak hypotheses output by the weak classifiers in regard to the first and second plurality of features and distinguishes whether the predetermined subject is shown in the input image based on the integrated value of the weak hypotheses, wherein each weak classifier classifies each of the first and second plurality of features to one of three or more sub-divisions based on threshold values, calculates sum divisions of the sub-divisions of the first and second plurality of features as whole divisions into which the first and second plurality of features is classified, and outputs, as one of the weak hypotheses, a reliability degree of the whole divisions assignable to the whole divisions of the first and second plurality of features, wherein the ensemble classifier is calculated by ensemble learning, and wherein in the ensemble learning, the reliability degree of the whole divisions is assignable to the respective whole divisions of each weak classifier.

* * * * *